(12) United States Patent
Fütterer et al.

(10) Patent No.: US 8,993,506 B2
(45) Date of Patent: *Mar. 31, 2015

(54) HYDROPHILIZED SUBSTRATE AND METHOD FOR HYDROPHILIZING A HYDROPHOBIC SURFACE OF A SUBSTRATE

(75) Inventors: Tobias Johannes Fütterer, Burlington, NJ (US); Robert Lee Reierson, Princeton Junction, NJ (US); Jean-Christophe Castaing, Burlington, NJ (US)

(73) Assignee: Rhodia Operations, Aubervilliers (FR)

( * ) Notice: Subject to any disclaimer, the term of this patent is extended or adjusted under 35 U.S.C. 154(b) by 1104 days.

This patent is subject to a terminal disclaimer.

(21) Appl. No.: 11/761,980

(22) Filed: Jun. 12, 2007

(65) Prior Publication Data

US 2008/0028986 A1 Feb. 7, 2008

Related U.S. Application Data

(60) Provisional application No. 60/812,819, filed on Jun. 12, 2006, provisional application No. 60/842,265, filed on Sep. 5, 2006.

(51) Int. Cl.
| | | |
|---|---|---|
| *C08G 65/335* | (2006.01) | |
| *C08J 7/04* | (2006.01) | |
| *D06M 13/288* | (2006.01) | |
| *D06M 15/333* | (2006.01) | |
| *D06M 15/667* | (2006.01) | |
| *D21H 27/30* | (2006.01) | |

(Continued)

(52) U.S. Cl.
CPC .............. *C08G 65/3355* (2013.01); *C08J 7/04* (2013.01); *D06M 13/288* (2013.01); *D06M 15/333* (2013.01); *D06M 15/667* (2013.01); *D21H 27/30* (2013.01); *D06M 15/53* (2013.01); *D06M 2200/00* (2013.01); *D21H 17/10* (2013.01)
USPC ........... 510/467; 510/431; 510/436; 524/127; 428/522; 428/378; 442/118

(58) Field of Classification Search
USPC ........... 428/522, 378; 442/118; 510/431, 436, 510/467; 524/127
See application file for complete search history.

(56) References Cited

U.S. PATENT DOCUMENTS

| | | |
|---|---|---|
| 2,438,091 A | 3/1948 | Lynch |
| 2,524,218 A | 10/1950 | Bersworth |
| 2,528,378 A | 10/1950 | Mannheimer |

(Continued)

FOREIGN PATENT DOCUMENTS

| | | |
|---|---|---|
| CA | 1182101 A1 | 2/1985 |
| CN | 1271030 A | 1/2000 |

(Continued)

OTHER PUBLICATIONS

Office Action mailed Oct. 3, 2008 in U.S. Appl. No. 12/137,647.

(Continued)

*Primary Examiner* — Kevin R Kruer

(57) ABSTRACT

A hydrophilized article includes (a) a substrate having a hydrophobic surface, and (b) a hydrophilizing layer disposed on at least a portion of the hydrophobic surface of the substrate. said layer comprising an organophosphorus material or a vinyl alcohol material, or a mixture of an organophosphorus material and a vinyl alcohol material.

40 Claims, 1 Drawing Sheet

(51) Int. Cl.
  *D06M 15/53* (2006.01)
  *D21H 17/10* (2006.01)

(56) References Cited

U.S. PATENT DOCUMENTS

| | | |
|---|---|---|
| 2,530,147 A | 11/1950 | Bersworth |
| 2,658,072 A | 11/1953 | Kosmin |
| 2,826,551 A | 3/1958 | Geen |
| 2,874,074 A | 2/1959 | Johnson |
| 2,946,725 A | 7/1960 | Norris et al. |
| 3,033,704 A | 5/1962 | Sherrill et al. |
| 3,070,510 A | 12/1962 | Cooley et al. |
| 3,244,724 A | 4/1966 | Guttmann |
| 3,308,067 A | 3/1967 | Diehl |
| 3,332,880 A | 7/1967 | Kessler et al. |
| 3,538,230 A | 11/1970 | Pader et al. |
| 3,553,139 A | 1/1971 | McCarty |
| 3,598,865 A | 8/1971 | Lew |
| 3,599,716 A | 8/1971 | Thompson |
| 3,678,154 A | 7/1972 | Widder et al. |
| 3,681,241 A | 8/1972 | Rudy |
| 3,717,630 A | 2/1973 | Booth |
| 3,723,322 A | 3/1973 | Diehl |
| 3,793,209 A | 2/1974 | Thompson |
| 3,850,831 A | 11/1974 | Hellsten et al. |
| 3,862,307 A | 1/1975 | Di Giulio |
| 3,869,412 A | 3/1975 | Waag |
| 3,893,929 A | 7/1975 | Basadur |
| 3,912,681 A | 10/1975 | Dickson |
| 3,939,911 A | 2/1976 | Maddox, Jr. et al. |
| 3,948,838 A | 4/1976 | Hinton, Jr. et al. |
| 3,956,198 A | 5/1976 | Bauer |
| 3,959,230 A | 5/1976 | Hays |
| 3,959,458 A | 5/1976 | Agricola et al. |
| 3,964,500 A | 6/1976 | Drakoff |
| 3,976,586 A | 8/1976 | Chakrabarti |
| 4,001,133 A | 1/1977 | Sorgenfrei et al. |
| 4,008,165 A | 2/1977 | Maddox, Jr. et al. |
| 4,017,410 A | 4/1977 | Sorgenfrei et al. |
| 4,038,027 A | 7/1977 | Kearney |
| 4,049,558 A | 9/1977 | Rasmussen |
| 4,051,234 A | 9/1977 | Gieske et al. |
| 4,101,457 A | 7/1978 | Place et al. |
| 4,116,984 A | 9/1978 | Prinzbach et al. |
| 4,127,489 A | 11/1978 | Pracht et al. |
| 4,144,226 A | 3/1979 | Crutchfield et al. |
| 4,146,495 A | 3/1979 | Crutchfield et al. |
| 4,152,416 A | 5/1979 | Spitzer et al. |
| 4,152,421 A | 5/1979 | Tsutsumi et al. |
| 4,206,215 A | 6/1980 | Bailey |
| 4,235,735 A | 11/1980 | Marco et al. |
| 4,240,919 A | 12/1980 | Chapman |
| 4,261,868 A | 4/1981 | Hora et al. |
| 4,264,580 A | 4/1981 | Barberio |
| 4,278,129 A | 7/1981 | Walton |
| 4,287,080 A | 9/1981 | Siklosi |
| 4,288,333 A | 9/1981 | van Zon et al. |
| 4,298,494 A | 11/1981 | Parslow et al. |
| 4,321,256 A | 3/1982 | Hasegawa et al. |
| 4,342,744 A | 8/1982 | Arai et al. |
| 4,350,680 A | 9/1982 | Harvey et al. |
| 4,361,465 A | 11/1982 | Graham |
| 4,361,611 A | 11/1982 | Schafer et al. |
| 4,364,837 A | 12/1982 | Pader |
| 4,385,000 A | 5/1983 | Walz et al. |
| 4,391,722 A | 7/1983 | Schwartz et al. |
| 4,393,935 A | 7/1983 | Walton |
| 4,470,923 A | 9/1984 | Koster |
| 4,483,779 A | 11/1984 | Llenado et al. |
| 4,507,219 A | 3/1985 | Hughes |
| 4,525,291 A | 6/1985 | Smith et al. |
| 4,536,317 A | 8/1985 | Llenado et al. |
| 4,536,318 A | 8/1985 | Cook et al. |
| 4,536,319 A | 8/1985 | Payne |
| 4,541,483 A | 9/1985 | Walton |
| 4,548,744 A | 10/1985 | Connor |
| 4,557,853 A | 12/1985 | Collins |
| 4,559,056 A | 12/1985 | Leigh et al. |
| 4,565,647 A | 1/1986 | Llenado |
| 4,579,681 A | 4/1986 | Ruppert et al. |
| 4,597,898 A | 7/1986 | Vander Meer |
| 4,599,188 A | 7/1986 | Llenado |
| 4,614,519 A | 9/1986 | Ruppert et al. |
| 4,627,977 A | 12/1986 | Gaffar et al. |
| 4,664,839 A | 5/1987 | Rieck |
| 4,702,857 A | 10/1987 | Gosselink |
| 4,711,730 A | 12/1987 | Gosselink et al. |
| 4,721,580 A | 1/1988 | Gosselink |
| 4,728,455 A | 3/1988 | Rerek |
| 4,734,099 A | 3/1988 | Cyprien |
| 4,746,456 A | 5/1988 | Kud et al. |
| 4,752,409 A | 6/1988 | Drapier et al. |
| 4,770,666 A | 9/1988 | Clauss |
| 4,801,395 A | 1/1989 | Chazard et al. |
| 4,813,482 A | 3/1989 | Walton |
| 4,831,176 A | 5/1989 | Holmberg et al. |
| 4,836,949 A | 6/1989 | Klajnscek |
| 4,859,358 A | 8/1989 | Gabriel et al. |
| 4,877,896 A | 10/1989 | Maldonado et al. |
| 4,886,609 A | 12/1989 | Walton |
| 4,889,945 A | 12/1989 | Wiedemann |
| 4,891,160 A | 1/1990 | Vander Meer |
| 4,894,220 A | 1/1990 | Nabi et al. |
| 4,902,499 A | 2/1990 | Bolish, Jr. et al. |
| 4,933,101 A | 6/1990 | Cilley et al. |
| 4,968,451 A | 11/1990 | Scheibel et al. |
| 4,976,879 A | 12/1990 | Maldonado et al. |
| 5,015,466 A | 5/1991 | Parran, Jr. et al. |
| 5,019,373 A | 5/1991 | Carter et al. |
| 5,038,864 A | 8/1991 | Dunleavy |
| 5,064,553 A | 11/1991 | Dixit et al. |
| 5,098,590 A | 3/1992 | Dixit et al. |
| 5,104,643 A | 4/1992 | Grollier et al. |
| 5,114,606 A | 5/1992 | van Vliet et al. |
| 5,130,043 A | 7/1992 | Prince et al. |
| 5,160,450 A | 11/1992 | Okahara et al. |
| 5,236,615 A | 8/1993 | Trinh et al. |
| 5,280,117 A | 1/1994 | Kerschner et al. |
| 5,332,528 A | 7/1994 | Pan et al. |
| 5,334,325 A | 8/1994 | Chaussee |
| 5,352,376 A | 10/1994 | Gutzmann |
| 5,370,865 A | 12/1994 | Yamagishi et al. |
| 5,405,542 A | 4/1995 | Trinh et al. |
| 5,410,807 A | 5/1995 | Bross et al. |
| 5,413,727 A | 5/1995 | Drapier et al. |
| 5,415,807 A | 5/1995 | Gosselink et al. |
| 5,415,860 A | 5/1995 | Beucherie et al. |
| 5,510,042 A | 4/1996 | Hartman et al. |
| 5,510,306 A | 4/1996 | Murray |
| 5,534,197 A | 7/1996 | Scheibel et al. |
| 5,550,274 A | 8/1996 | Reierson |
| 5,554,781 A | 9/1996 | Reierson |
| 5,559,261 A | 9/1996 | Sivik |
| 5,565,145 A | 10/1996 | Watson et al. |
| 5,573,709 A | 11/1996 | Wells |
| 5,607,680 A | 3/1997 | Brissonnet et al. |
| 5,611,991 A | 3/1997 | Naraghi |
| 5,648,584 A | 7/1997 | Murray |
| 5,648,585 A | 7/1997 | Murray et al. |
| 5,686,024 A | 11/1997 | Dahanayake et al. |
| 5,710,121 A | 1/1998 | Tracy et al. |
| 5,798,326 A | 8/1998 | Goldstein et al. |
| 5,804,542 A | 9/1998 | Scheper et al. |
| 5,824,289 A | 10/1998 | Stoltz |
| 5,849,960 A | 12/1998 | Singleton et al. |
| 5,853,710 A | 12/1998 | Dehan et al. |
| 5,858,343 A | 1/1999 | Szymczak |
| 5,879,469 A | 3/1999 | Avram |
| 5,902,574 A | 5/1999 | Stoner et al. |
| 5,902,778 A | 5/1999 | Hartmann et al. |
| 5,939,052 A | 8/1999 | White, Jr. et al. |
| 5,968,893 A | 10/1999 | Manohar et al. |
| 6,017,936 A | 1/2000 | Polson et al. |
| 6,136,221 A | 10/2000 | Reierson |

(56) References Cited

U.S. PATENT DOCUMENTS

| | | | |
|---|---|---|---|
| 6,149,693 A | 11/2000 | Geib | |
| 6,150,222 A | 11/2000 | Gardner et al. | |
| 6,187,391 B1 | 2/2001 | Kataoka et al. | |
| 6,220,352 B1 | 4/2001 | Walton | |
| 6,222,077 B1 | 4/2001 | Singleton | |
| 6,242,404 B1 | 6/2001 | Dahanayake et al. | |
| 6,271,409 B1 | 8/2001 | Geib | |
| 6,297,201 B1 | 10/2001 | Geib | |
| 6,342,468 B1 | 1/2002 | Geib | |
| 6,387,137 B1 | 5/2002 | Geib | |
| 6,420,323 B2 | 7/2002 | Geke et al. | |
| 6,448,324 B1 * | 9/2002 | Nodera et al. | 524/451 |
| 6,525,005 B1 | 2/2003 | Kravitz et al. | |
| 6,566,313 B1 | 5/2003 | Hohenstein et al. | |
| 6,569,261 B1 | 5/2003 | Aubay et al. | |
| 6,579,466 B1 | 6/2003 | David et al. | |
| 6,593,288 B2 | 7/2003 | Aubay et al. | |
| 6,726,757 B2 | 4/2004 | Sarkisian et al. | |
| 6,767,410 B2 | 7/2004 | Aubay et al. | |
| 6,767,560 B2 | 7/2004 | Paek | |
| 6,864,314 B1 | 3/2005 | Yeung et al. | |
| 6,924,260 B2 | 8/2005 | Aubay | |
| 7,241,724 B2 | 7/2007 | Carnali et al. | |
| 7,262,153 B2 | 8/2007 | Shpakoff et al. | |
| 7,332,023 B2 | 2/2008 | Rehman et al. | |
| 7,381,251 B2 | 6/2008 | Baker et al. | |
| 7,381,695 B2 | 6/2008 | Minevski | |
| 7,416,735 B2 | 8/2008 | El-Nokaly et al. | |
| 7,521,404 B2 | 4/2009 | Luu et al. | |
| 7,524,800 B2 | 4/2009 | Fütterer et al. | |
| 7,524,808 B2 | 4/2009 | Fütterer et al. | |
| 7,550,419 B2 | 6/2009 | Fütterer et al. | |
| 7,557,072 B2 | 7/2009 | Fütterer et al. | |
| 7,608,571 B2 | 10/2009 | Fütterer et al. | |
| 7,919,073 B2 | 4/2011 | Futterer et al. | |
| 7,919,449 B2 | 4/2011 | Futterer et al. | |
| 2002/0174605 A1 | 11/2002 | Hokkirigawa | |
| 2003/0044469 A1 | 3/2003 | Viladot Petit et al. | |
| 2003/0228339 A1 | 12/2003 | El-Nokaly et al. | |
| 2004/0185027 A1 | 9/2004 | Reierson et al. | |
| 2004/0191471 A1 | 9/2004 | Yahata et al. | |
| 2004/0247534 A1 | 12/2004 | Stoltz | |
| 2005/0020466 A1 | 1/2005 | Man et al. | |
| 2005/0031705 A1 | 2/2005 | Tyndall et al. | |
| 2005/0037939 A1 | 2/2005 | Lawrence | |
| 2005/0082090 A1 | 4/2005 | Grainger et al. | |
| 2005/0184273 A1 | 8/2005 | Morelli et al. | |
| 2005/0199428 A1 | 9/2005 | Dixon | |
| 2006/0088482 A1 | 4/2006 | Wulknitz et al. | |
| 2006/0093559 A1 | 5/2006 | Fabry | |
| 2006/0135384 A1 | 6/2006 | Luu et al. | |
| 2006/0159631 A1 | 7/2006 | Buch et al. | |
| 2006/0217286 A1 | 9/2006 | Geoffroy et al. | |
| 2006/0241008 A1 | 10/2006 | Baker et al. | |
| 2007/0000067 A1 | 1/2007 | Shi | |
| 2007/0079964 A1 | 4/2007 | Shpakoff et al. | |
| 2007/0145617 A1 | 6/2007 | Finney et al. | |
| 2007/0166243 A1 | 7/2007 | Yoshida et al. | |
| 2007/0286893 A1 | 12/2007 | Marsh et al. | |
| 2007/0286894 A1 | 12/2007 | Marsh et al. | |
| 2008/0095719 A1 | 4/2008 | Herrmann et al. | |
| 2008/0220031 A1 | 9/2008 | Wunsch et al. | |
| 2009/0123396 A1 | 5/2009 | Reierson et al. | |
| 2009/0123407 A1 | 5/2009 | Futterer et al. | |
| 2009/0124525 A1 | 5/2009 | Futterer et al. | |
| 2009/0169493 A1 | 7/2009 | Reierson et al. | |
| 2009/0238775 A1 | 9/2009 | Futterer et al. | |

FOREIGN PATENT DOCUMENTS

| | | |
|---|---|---|
| CS | 218380 B | 2/1983 |
| DE | 2829022 | 1/1980 |
| DE | 35 31 128 C1 | 5/1986 |
| DE | 199 54 830 C1 | 5/2001 |
| EP | 0011984 | 6/1980 |
| EP | 0066915 | 12/1982 |
| EP | 0132043 | 1/1985 |
| EP | 0132046 | 1/1985 |
| EP | 0219048 | 4/1987 |
| EP | 0488868 | 6/1992 |
| EP | 0561656 | 9/1993 |
| EP | 0909809 | 4/1999 |
| EP | 1752524 A2 | 2/2002 |
| EP | 1196523 | 4/2002 |
| EP | 1196527 | 4/2002 |
| EP | 1196528 | 4/2002 |
| FR | 2236926 | 2/1975 |
| FR | 2334698 | 7/1977 |
| GB | 849433 | 9/1960 |
| GB | 1314897 | 4/1973 |
| GB | 1475798 | 6/1977 |
| GB | 1498520 | 1/1978 |
| GB | 1 515 792 | 6/1978 |
| GB | 1537288 | 12/1978 |
| GB | 1578930 | 11/1980 |
| GB | 2054598 A | 2/1981 |
| GB | 2 192 194 A | 1/1988 |
| GB | 2200356 A | 8/1988 |
| GB | 2 283 036 A | 4/1995 |
| GB | 2 283 755 A | 5/1995 |
| JP | 47050654 B4 | 12/1972 |
| JP | 56062833 A2 | 5/1981 |
| JP | 60193909 A | 10/1985 |
| JP | 62033785 A2 | 2/1987 |
| JP | 63-112590 A | 5/1988 |
| JP | 1-020378 A | 1/1989 |
| JP | 64-006173 A | 1/1989 |
| JP | 64020300 A | 1/1989 |
| JP | 3157323 A | 7/1991 |
| JP | 047547 | 1/1992 |
| JP | 05-263362 A | 10/1993 |
| JP | 06-022892 A | 2/1994 |
| JP | 6313271 | 11/1994 |
| JP | H11-156213 A | 6/1999 |
| JP | 11508318 A | 7/1999 |
| JP | 11-256479 * | 9/1999 |
| JP | 11-256479 A | 9/1999 |
| JP | 2000-510885 A | 8/2000 |
| JP | 2000239696 A | 9/2000 |
| JP | 2001176864 A2 | 6/2001 |
| JP | 2001-271270 * | 10/2001 |
| JP | 2003342140 A | 12/2003 |
| JP | 2004018789 A | 1/2004 |
| JP | 2004-076165 A | 3/2004 |
| JP | 2005-013929 | 1/2005 |
| JP | 2005-013929 A | 1/2005 |
| WO | 9532272 | 11/1995 |
| WO | 9532997 | 12/1995 |
| WO | 9623859 | 8/1996 |
| WO | 9623860 | 8/1996 |
| WO | 9623861 | 8/1996 |
| WO | 97/42287 A1 | 11/1997 |
| WO | 97/42288 A1 | 11/1997 |
| WO | 9742252 A1 | 11/1997 |
| WO | 9742288 | 11/1997 |
| WO | 9742293 A1 | 11/1997 |
| WO | 9838973 | 9/1998 |
| WO | 9841505 | 9/1998 |
| WO | 00/37736 A | 6/2000 |
| WO | 2004/082500 A2 | 9/2004 |
| WO | 2006/005721 A1 | 1/2006 |

OTHER PUBLICATIONS

Office Action mailed Oct. 3, 2008 in U.S. Appl. No. 12/138,030.
Office Action mailed Oct. 10, 2008 in U.S. Appl. No. 12/137,823.
Notice of Allowance mailed Nov. 13, 2008 in U.S. Appl. No. 12/137,738.
Notice of Allowance mailed Oct. 29, 2008 in U.S. Appl. No. 12/137,589.
U.S. Appl. No. 12/137,589, "Mono-, Di- and Polyol Phosphate Esters in Personal Care Formulations", Futterer et al., filed Jun. 12, 2008.

(56) References Cited

OTHER PUBLICATIONS

U.S. Appl. No. 12/137,647, "Mono-, Di- and Polyol Phosphate Esters in Oral Care Formulations and Methods for Using Same", Futterer et al., filed Jun. 12, 2008.
U.S. Appl. No. 12/137,738 "Hard Surface Cleaning Composition with Hydrophilizing Agent and Method for Cleaning Hard Surfaces", Futterer et al., filed Jun. 12, 2008.
U.S. Appl. No. 12/137,823 "Method for Recovering Crude Oil from a Subterranean Formation", Futterer et al., filed Jun. 12, 2008.
U.S. Appl. No. 12/138,030 "Detergent Composition with Hydrophilizing Soil-Release Agent and Methods for Using Same", Futterer et al., filed Jun. 12, 2008.
Notice of Allowance dated Sep. 1, 2010, in U.S. Appl. No. 12/349,401 to Futterer et al.
Office Action dated May 12, 2010, in U.S. Appl. No. 12/471,442 to Futterer et al.
Notice of Allowance dated Jun. 18, 2009, in U.S. Appl. No. 12/137,823 to Futterer et al.
Office Action dated May 14, 2010, in U.S. Appl. No. 12/349,401 to Futterer et al.
Office Action dated May 13, 2010, in U.S. Appl. No. 12/471,439 to Futterer et al.
Non-final Office Action mailed Dec. 3, 2010 in U.S. Appl. No. 12/349,490 (10 pages).
Notice of Allowance/Allowability mailed Dec. 3, 2010 in U.S. Appl. No. 12/471,442 (7 pages).
Notice of Allowance/Allowability mailed Nov. 30, 2010 in U.S. Appl. No. 12/471,439 (7 pages).
Office action mailed Aug. 2, 2011 for U.S. Appl. No. 12/349,490 to Futterer et al.
Office action mailed Sep. 16, 2011 for U.S. Appl. No. 13/071,376 to Futterer et al.
Utkelov et al., Synthesis of Chelating Flotation Reagents, Inst. Nov. Tekhnol. Mater., Izvestiya Natsional'noi Akademili Nauk Respubliki Kazakhstan, Seriya Khimicheskaya (1995), (5), 74-80 (Abstract only).
Lubrizol webpage, URL: <http://www.lubrizol.com/Household/Pemulen/default.html>, retrieved from the Internet Feb. 22, 2012.
Chemistry Store webpage, URL:< http://www.chemistrystore.com/Preservatives-Suttocide_A.html >, retrieved from the Internet Feb. 22, 2012.
Wikipedia—Iodophor, URL:<http://en.wikipedia.org/wiki/Iodophor>, retrieved from the Internet Feb. 22, 2012.
Collection of excerpts from Phosphorous and its Compounds, vol. II, Van Wazer, editor, Interscience Publishers, p. 1309-1311 (1961); Roberts et al, Basic Principles of Organic Chemistry, W.A. Benjamin, Inc., p. 630 (1964); and The Merck Index., Merck & Co., Inc., p. 20-21 (1976).
RHODAFAC PA-35 Product Data Sheet, Rhodia Inc. (Mar. 2010).
LookChem.com, URL: <http://www.lookchem.com/search.aspx?type=productname&k=RHODAFAC%20PC-100&path=/search.aspx>; retrieved from the Internet Dec. 29, 2011.
RHODAFAC PL-620 Manufacturer's Safety Data Sheet, Rhodia Inc., Jul. 27, 2007, URL: <http://www.chempak.net/msds/RHODAFAC%20PL-620.PDF>: retrieved from the Internet Dec. 22, 2011.
Chemical Summary for Phosphate Ester of polyoxyalkylated fatty alcohol from www.PesticideInfo.org, URL: <http://www.pesticideinfo.org/Summary_Chemical.jsp?Rec_Id=PC35746>: retrieved from the Internet Dec. 22, 2011.
RHODAFAC PL-6 Manufacturer's Safety Data Sheet, Rhodia Inc., Sep. 22, 2008.
GuideChem, URL: < http://www.guidechem.com/products/68130-47-2.html>; retrieved from the Internet Dec. 22, 2011.
LookChem, URL: <http://www.lookchem.com/search.aspx?type=productname&k=EMPHOS%20PS-236&path=/cas-689/68908-64-5.html>: retrieved from the Internet Dec. 29, 2011.
LookChem, URL: <http://www.lookchem.com/search.aspx?type=productname&k=ETHFAC&path=/search.aspx>; retrieved from the Internet Dec. 29, 2011.
Office action mailed Jul. 6, 2011 from U.S. Appl. No. 13/072,690 to Futterer et al.
Notice of Allowance and Fee(s) Due from related application, U.S. Appl. No. 12/349,490 to Futterer et al.
Wikipedia, Adenosine diphosphate,URL:<http://en.wikipedia.org/wiki/Adenosine_diphosphate>, retrieved from the Internet, Apr. 19, 2011.
Wikipedia, Pyrophosphoric acid,URL:<http://en.wikipedia.org/wiki/Pyrophosphoric_acid>, retrieved from the Internet, Apr. 19, 2011.
Notice of Allowance mailed Mar. 21, 2012 in U.S. Appl. No. 12/349,490 to Futterer.
Notice of Allowance mailed Mar. 23, 2012 in U.S. Appl. No. 12/957,080 to Futterer.
Notice of Allowance mailed Mar. 6, 2012 in U.S. Appl. No. 13/071,376 to Futterer.
Notice of Allowance mailed Mar. 20, 2012 in U.S. Appl. No. 13/072,690 to Futterer.
Mar. 22, 2012, Australian Office action from AU application No. 2007257680 to Rhodia Inc. corresponding to U.S. Appl. No. 11/761,980 to Futterer et al.
Jul. 13, 2011, Extended European Search Report from EP application No. 07812122.5 to Rhodia Inc. corresponding to U.S. Appl. No. 11/761,980 to Futterer et al.
Diphosphoric acid, P,P'-dibutyl ester, LookChem, URL:< http://www.lookchem.com/chemical-dictionary/de/product_d/69537-43-5/>; retrieved from the Internet Apr. 13, 2012.
Jun. 3, 2013, Office Action for European Patent Application No. 13152263.3 to Rhodia Inc.

* cited by examiner

HYDROPHILIZED SUBSTRATE AND METHOD FOR HYDROPHILIZING A HYDROPHOBIC SURFACE OF A SUBSTRATE

CROSS REFERENCE TO RELATED APPLICATIONS

This claims the benefit of U.S. Provisional Patent Application Nos. 60/812,819 filed Jun. 12, 2006 and 60/842,265, filed Sep. 5, 2006, each of which is incorporated by reference in its entirety.

FIELD OF THE INVENTION

This invention relates to a hydrophilized substrate and a method for hydrophilizing a hydrophobic surface of a substrate.

BACKGROUND OF THE INVENTION

Materials that have a low surface energy, such as, for example, polyolefin polymers, have hydrophobic surfaces. The hydrophobic properties of such materials are not desirable in some applications and methods for hydrophilizing low surface energy substrates, including treatment with surfactants and/or high energy treatment, are known. Each of these methods has significant limitations. Surfactant treatments tend to wash off when a treated substrate is exposed to water and the charges imparted to the surface of a treated substrate by high energy treatment tend, particularly in the case of a thermoplastic polymer substrate, to dissipate. The hydrophilic properties of such surfactant treated substrates and high energy treated substrates thus tend to exhibit limited durability. Furthermore, the surfactants that are rinsed off of a treated substrate by exposure to water alter the properties of the water, such as lowering the surface tension, which may also be undesirable.

Hydrophilized polyolefin fabrics are used in some products, including disposable absorbent articles, such as diapers, adult incontinence products, wipes, and feminine hygiene products, wherein a hydrophilic surface is desirable, but the durability of the hydrophilic properties of such surface is limited, due to the limitations of available hydrophilization techniques.

Accordingly, there is a need for more durably hydrophilizing low surface energy substrates.

SUMMARY OF THE INVENTION

In a first aspect, the present invention is directed to a hydrophilized article as disclosed by U.S. Provisional Patent Application Nos. 60/812,819 filed Jun. 12, 2006 and 60/842,265, filed Sep. 5, 2006 (each of which is incorporated by reference in its entirety), comprising:

a substrate having a hydrophobic surface, and a hydrophilizing layer disposed on at least a portion of the hydrophobic surface of the substrate, said layer comprising:

(b)(I) an organophosphorus material selected from:

(b)(I)(1) organophosphorus compounds according to structure (I):

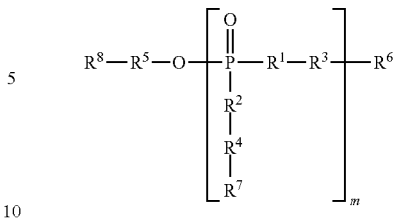

wherein:

each $R^1$ is and each $R^2$ is independently absent or O, provided that at least one of $R^1$ and $R^2$ is O, each $R^3$ is independently alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy, $R^5$ is and each $R^4$ is independently absent or alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy, $R^6$ and $R^8$ are each and each $R^7$ is independently H, or $(C_1$-$C_{30})$hydrocarbon, which hydrocarbon may optionally be substituted on one or more carbon atoms by hydroxyl, fluorine, alkyl, alkenyl or aryl and/or interrupted at one or more sites by an O, N, or S heteroatom, or —$POR^9R^{10}$, $R^9$ and $R^{10}$ are each independently hydroxyl, alkoxy, aryloxy, or $(C_1$-$C_{30})$hydrocarbon, which hydrocarbon may optionally be substituted on one or more carbon atoms by hydroxyl, fluorine, alkyl, alkenyl or aryl and/or interrupted at one or more sites by an O, N, or S heteroatom, and m is an integer of from 1 to 5, (b)(I)(2) salts of organophosphorus compounds according to structure (I), (b)(I)(3) condensation reaction products of two or more molecules of one or more organophosphorus compounds according to structure (I), and (b)(I)(4) mixtures comprising two or more of the compounds, salts, and/or reaction products of (b)(I)(1), (b)(I)(2), and (b)(I)(3), (b)(II) optionally a vinyl alcohol material selected from:

(b)(II)(1) polymers comprising monomeric units according to structure (I-a):

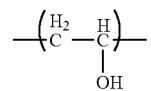

(b)(II)(2) salts of polymers (b)(II)(1), (b)(II)(3) reaction products of two or more molecules of one or more polymers (b)(II)(1), and (b)(II)(4) mixtures comprising two or more of the polymers, salts, and/or reaction products of (b)(II)(1), (b)(II)(2), and (b)(II)(3), and (b)(III) mixtures of one or more organophosphorus materials (b)(I) and one or more vinyl alcohol materials (b)(II).

In a second aspect, the present invention is directed to a method for hydrophilizing a substrate having a hydrophobic surface, comprising treating such at least a portion of such hydrophobic surface with a treatment composition comprising an organophosphorus material, a vinyl alcohol material, or a mixture thereof, as described above to deposit a hydrophilizing layer on such portion of such hydrophobic surface.

In a third aspect, the present invention is directed to an absorbent article, comprising:
a fiber substrate having a hydrophobic surface, and
a hydrophilizing layer disposed on at least a portion of the hydrophobic surface of the fiber substrate, said layer comprising:
(b)(I) an organophosphorus material selected from:
(b)(I)(1) organophosphorus compounds according to structure (I):

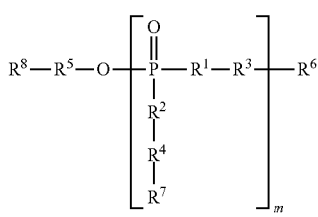

wherein:
each $R^1$ is and each $R^2$ is independently absent or O, provided that at least one of $R^1$ and $R^2$ is O,
each $R^3$ is independently alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy,
$R^5$ is and each $R^4$ is independently absent or alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy,
$R^6$ and $R^8$ are each and each $R^7$ is independently H, or ($C_1$-$C_{30}$)hydrocarbon, which hydrocarbon may optionally be substituted on one or more carbon atoms by hydroxyl, fluorine, alkyl, alkenyl or aryl and/or interrupted at one or more sites by an O, N, or S heteroatom, or —$POR^9R^{10}$,
$R^9$ and $R^{10}$ are each independently hydroxyl, alkoxy, aryloxy, or ($C_1$-$C_{30}$)hydrocarbon, which hydrocarbon may optionally be substituted on one or more carbon atoms by hydroxyl, fluorine, alkyl, alkenyl or aryl and/or interrupted at one or more sites by an O, N, or S heteroatom, and
m is an integer of from 1 to 5,
(b)(I)(2) salts of organophosphorus compounds according to structure (I),
(b)(I)(3) condensation reaction products of two or more molecules of one or more organophosphorus compounds according to structure (I),
(b)(I)(4) mixtures comprising two or more of the compounds, salts, and/or reaction products of (I)(1), (I)(2), and (I)(3),
(b)(II) optionally a vinyl alcohol material selected from:
(b)(II)(1) polymers comprising monomeric units according to structure (I-a):

(b)(II)(2) salts of polymers (b)(II)(1),
(b)(II)(3) reaction products of two or more molecules of one or more polymers (b)(I)(1), and
(b)(II)(4) mixtures comprising two or more of the polymers, salts, and/or reaction products of (b)(I)I(1), (b)(II)(2), and (b)(II)(3), and
(b)(III) mixtures of one or more organophosphorus materials (b)(I) and one or more vinyl alcohol materials (b)(II).

DETAILED DESCRIPTION OF THE INVENTION

Figure 1:
FIG. 1 shows untreated Polyamide on which water is distributed along the fibers due to capillary forces only.

As used herein, the terminology "hydrophobic surface" means a surface that exhibits a tendency to repel water and to thus resist being wetted by water, as evidenced by a water contact angle of greater than or equal to 70°, more typically greater than or equal to 90°, and/or a surface free energy of less than or equal to about 40 dynes/cm.

As used herein, the terminology "hydrophilic surface" means a surface that exhibits an affinity for water and to thus be wettable by water, as evidenced by a water contact angle of less than 70°, more typically less than 60° and/or a surface energy of greater than about 40 dynes/cm, more typically greater than or equal to about 50 dynes/cm.

As used herein in reference to a hydrophobic surface, the term "hydrophilizing" means rendering such surface more hydrophilic and thus less hydrophobic, as indicated by a decreased water contact angle. One indication of increased hydrophilicity of a treated hydrophobic surface is a decreased water contact angle with a treated surface compared to the water contact angle with an untreated surface.

A used herein in reference to a substrate, the terminology "water contact angle" means the contact angle exhibited by a droplet of water on the surface as measured by a conventional image analysis method, that is, by disposing a droplet of water on the surface, typically a substantially flat surface, at 25° C., photographing the droplet, and measuring the contact angle shown in the photographic image.

Surface energy is estimated using the Young equation:

$$\cos(\theta) * \gamma_{lv} = \gamma_{sv} - \gamma_{sl}$$

with the contact angle θ, the interfacial energy $\gamma_{sv}$ between the solid and the vapor phase, the interfacial energy $\gamma_{sl}$ between the solid and the liquid phase, and the interfacial energy $\gamma_{lv}$ between the liquid and the vapor phase, and $\gamma_{sv}$ represents the surface energy of the solid.

As used herein, "molecular weight" in reference to a polymer or any portion thereof, means to the weight-average molecular weight ("$M_w$") of said polymer or portion, wherein $M_w$ of a polymer is a value measured by gel permeation chromatography and $M_w$ of a portion of a polymer is a value calculated according to known techniques from the amounts of monomers, polymers, initiators and/or transfer agents used to make the said portion.

As used herein, the notation "($C_n$-$C_m$)" in reference to an organic group or compound, wherein n and m are integers, means that the group or compound contains from n to m carbon atoms per such group or compound.

In one embodiment, the present invention is directed to a hydrophilized article, comprising:
a substrate having a hydrophobic surface, and a hydrophilizing layer disposed on at least a portion of the hydrophobic surface of the substrate, said layer comprising an organophosphorus material selected from:

(b)(I)(1) organophosphorus compounds according to structure (I):

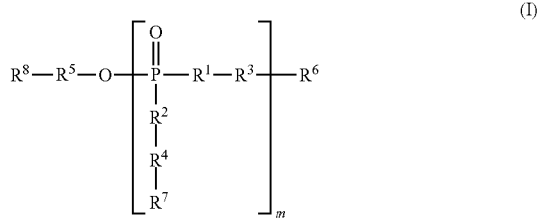

wherein:

each $R^1$ is and each $R^2$ is independently absent or O, provided that at least one of $R^1$ and $R^2$ is O, each $R^3$ is independently alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy, $R^5$ is and each $R^4$ is independently absent or alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy, $R^6$ and $R^8$ are each and each $R^7$ is independently H, or ($C_1$-$C_{30}$)hydrocarbon, which hydrocarbon may optionally be substituted on one or more carbon atoms by hydroxyl, fluorine, alkyl, alkenyl or aryl and/or interrupted at one or more sites by an O, N, or S heteroatom, or —$POR^9R^{10}$, $R^9$ and $R^{10}$ are each independently hydroxyl, alkoxy, aryloxy, or ($C_1$-$C_{30}$)hydrocarbon, which hydrocarbon may optionally be substituted on one or more carbon atoms by hydroxyl, fluorine, alkyl, alkenyl or aryl and/or interrupted at one or more sites by an O, N, or S heteroatom, and m is an integer of from 1 to 5, (b)(I)(2) salts of organophosphorus compounds according to structure (I), (b)(I)(3) condensation reaction products of two or more molecules of one or more organophosphorus compounds according to structure (I), and (b)(I)(4) mixtures comprising two or more of the compounds, salts, and/or reaction products of (b)(I)(1), (b)(I)(2), and (b)(I)(3).

In one embodiment, the present invention is directed to a hydrophilized article, comprising:

a substrate having a hydrophobic surface.

a hydrophilizing layer disposed on at least a portion of the hydrophobic surface of the substrate, said layer comprising a vinyl alcohol material selected from:

(b)(II)(1) polymers comprising monomeric units according to structure (I-a):

(b)(II)(2) salts of polymers (b)(II)(1), (b)(II)(3) reaction products of two or more molecules of one or more polymers (b)(II)(1), and (b)(II)(4) mixtures comprising two or more of the polymers, salts, and/or reaction products of (b)(II)(1), (b)(II)(2), and (b)(II)(3).

In one embodiment, the present invention is directed to a hydrophilized article, comprising:

a substrate having a hydrophobic surface, and a hydrophilizing layer disposed on at least a portion of the hydrophobic surface of the substrate, said layer comprising a mixture of one or more organophosphorus materials (b)(I) and one or more vinyl alcohol materials (b)(II).

Substrate Material

The substrate having a hydrophobic surface may be in any physical shape or configuration, such as for example, particles, sheets, films, fibers, extruded profiles, woven fabrics, and non-woven fabrics and comprises a hydrophobic material.

Suitable hydrophobic materials comprise, for example, hydrophobically modified inorganic materials, e.g. tiles, silanized glass and silica, graphite, hydrophobic biomaterial such as plant leaves, and hydrophobic polymers. Hydrophobic polymers include for example, polyolefins, such as poylethylene, poly(isobutene), poly(isoprene), poly(4-methyl-1-pentene), polypropylene, ethylene-propylene copolymers, and ethylenepropylene-hexadiene copolymers; ethylene-vinyl acetate copolymers; styrene polymers, such as poly(styrene), poly(2-methylstyrene), styrene-acrylonitrile copolymers having less than about 20 mole-percent acrylonitrile, and styrene-2,2,3,3,-tetrafluoro-propyl methacrylate copolymers; halogenated hydrocarbon polymers, such as poly (chloro-trifluoroethylene), chlorotrifluoroethylene-tetrafluoroethylene copolymers, poly(hexafluoropropylene), poly(tetrafluoroethylene), tetrafluoroethylene-ethylene copolymers, poly(trifluoroethylene), poly(vinyl fluoride), and poly(vinylidene fluoride); vinyl polymers, such as poly (vinyl butyrate), poly(vinyl decanoate), poly(vinyl dodecanoate), poly(vinyl hexadecanoate), poly(vinyl hexanoate), poly(vinyl propionate), poly(vinyl octanoate), poly(heptafluoroisopropoxyethylene), 1-heptafluoroisopropoxy-methylethylene-maleic acid copolymers, poly(heptafluoroisopropoxypropylene), poly-(methacrylonitrile), poly(vinyl butyral), poly(ethoxyethylene), poly(methoxy-ethylene), and poly(vinyl formal); acrylic polymers, such as poly(n-butyl acetate), poly(ethyl acrylate), poly[(1-chlorodifluoromethyl) tetrafluoroethyl acrylate], poly[di(chloro-fluoromethyl)fluoromethyl acrylate], poly(1,1-dihydroheptafluorobutyl acrylate), poly(1,1-dihydropentafluoroisopropyl acrylate), poly (1,1-dihydropentadecafluorooctyl acrylate), poly (heptafluoroisopropyl acrylate), poly[5-(heptafluoroiospropoxy)-pentyl acrylate], poly[11-(heptafluoroiospropoxy)undecyl acrylate], poly[2-(heptafluoropropoxy)ethyl acrylate], and poly (nonafluoroisobutyl acrylate); methacrylic polymers, such as poly(benzyl methacrylate), poly(n-butyl methacrylate), poly (isobutyl meth-acrylate), poly(t-butyl methacrylate), poly(t-butylaminoethyl methacrylate), poly(dodecyl methacrylate), poly(ethyl methacrylate), poly(2-ethylhexyl methacrylate), poly(n-hexyl methacrylate), poly(dimethylaminoethyl methacrylate), poly(hydroxyethyl methacrylate), poly(phenyl methacrylate), poly(n-propyl methacrylate), poly(octadecyl methacrylate), poly(1,1-dihydropentadecafluorooctyl methacrylate), poly(heptafluoroisopropyl methacrylate), poly (heptadecafluorooctyl methacrylate), poly(1-hydrotetrafluoroethyl methacrylate), poly(1,1-dihydrotetrafluoropropyl methacrylate), poly(1-hydrohexafluoroisopropyl methacrylate), and poly(t-nonafluorobutyl methacrylate); polyethers, such as poly(chloral), poly(oxybutene)diol, poly(oxyisobutene)diol, poly(oxydecamethylene), poly(oxyethylene)-dimethyl ether polymers having molecular weights below about 1,500, poly(oxyhexamethylene)diol, poly(oxypropylene)diol, poly(oxypropylene)-dimethyl ether, and poly(oxytetramethylene); polyether copolymers, such as poly(oxyethylene)-poly(oxypropylene)-poly(oxyethylene) block copolymers, oxyethylene-oxypropylene copolymers having greater than about 20 mole percent oxypropylene, oxytetramethylene-oxypropylene copolymers, and block copolymers having oxyethylene-oxypropylene copolymer blocks separated by a poly(oxydimethylsilylene) block; polyamides, such as poly[imino(1-oxodecamethylene)], poly[imino(1-oxododecamethylene)] or nylon 12, poly[imino(1-oxohexamethylene)] or nylon 6, poly[imino(1-oxotetramethylene)] or nylon 4, poly(iminoazelaoyliminononamethylene), poly(iminosebacoyliminodecamethylene), and poly(iminosuberoyliminooctamethylene); polyimines, such as poly[(benzoylimino)ethylene], poly[(butyrylimino)ethylene], poly[(dodecanoylimino)ethylene], (dodecanoylimino) ethylene-(acetyleimino)trimethylene copolymers, poly [(heptanoylimino)ethylene], poly[(hexanoylimino) ethylene], poly{[(3-methyl)butyrylimino]ethylene}, poly [(pentadecafluorooctadecanoylimino)ethylene], and poly [(pentanoylimino)ethylene]; polyurethanes, such as those prepared from methylenediphenyl diisocyanate and butanediol poly(oxytetramethylene)diol, hexamethylene diisocyanate and triethylene glycol, and 4-methyl-1,3-phenylene diisocyanate and tripropylene glycol; polysiloxanes, such as poly(oxydimethylsilylene) and poly(oxymethylphenylsilylene); and cellulosics, such as amylose, amylopectin, cellulose acetate butyrate, ethyl cellulose, hemicellulose, and nitrocellulose.

In one embodiment, the substrate comprises one or more fibers. As used herein, the term "fiber" means a generally elongated article having a characteristic longitudinal dimension, typically a "length", and a characteristic transverse dimension, typically a "diameter" or a "width", wherein the ratio of the characteristic longitudinal dimension to the characteristic transverse dimension is greater than or equal to about 50, more typically greater than or equal to about 100.

Suitable fibers are those that have a hydrophobic surface and are typically hydrophobic synthetic polymer fibers, such as polyacrylonitrile fibers, poly(ethyleneterephthalate) fibers, and poly(olefin) fibers, such as, for example, poly(ethylene) fibers or poly(propylene) fibers. However, other fibers, as discussed herein, are also suitable.

In one embodiment, the hydrophilized fabric of the present invention is a woven fabric comprising fibers having hydrophobic surfaces.

In one embodiment, the hydrophilized fabric of the present invention is a non-woven fabric comprising fibers having hydrophobic surfaces.

In one embodiment, the fabric is a nonwoven fabric in a web format comprising fibers having hydrophobic surfaces. Nonwoven materials are well know, see, for example, Butler I., et. al., *Nonwovens Fabric Handbook*, Assoc. of the Nonwoven Fabrics Industry (1999).

Nonwoven fiber webs are typically formed by direct extrusion processes, such as spunbonding, meltblowing, solvent spinning, or electrospinning, in which the fibers and web are formed simultaneously, or by preformed fiber processes, such as dry laying or wet laying, in which fibers are laid into webs at a time subsequent to fiber formation, or by combinations of such processes, such as by spunbond-meltblown-spunbond, spunbond-airlaid, and meltblown-airlaid processes.

Typically, at least a portion of the fibers of a nonwoven fiber web are oriented with some non-zero angle relative to other fibers of the web. Places were two or more fibers touch, in either an adjacent or overlapping manner, are typically called "junctions". The fibers of a nonwoven fiber web are typically joined to one or more of the other fibers of the web, by, for example, thermal bonding, pressure bonding, ultrasonic bonding, or solvent bonding, at least some of the junctions.

In one embodiment, two or more nonwoven fiber webs are stacked to form a nonwoven fiber web laminate material. In another embodiment, one or more nonwoven fiber webs are stacked with one or more other materials, such as non-porous polymeric films or sheets, to form composite laminate materials.

The combination of the textile fabric or the nonwoven fabric and the composition of the invention can be selected, as required, depending on the use purpose, as described by U.S. Pat. No. 6,187,391, hereby incorporated by reference in its entirety.

Preferable examples of combinations of a hydrophobic textile fabric or nonwoven fabric and a hydrophilic composition include a combination of a polyester-type textile fabric or nonwoven fabric and acrylic acid, a combination of a polyester-type textile fabric or nonwoven fabric and methacrylic acid, a combination of a polyester-type textile fabric or nonwoven fabric and 2-hydroxyethyl acrylate, a combination of a polyester-type textile fabric or non-woven fabric and 2-hydroxyethyl methacrylate, a polyester-type textile fabric or nonwoven fabric and N-vinyl-2-pyrrolidone, a polyamide-type textile fabric or nonwoven fabric and acrylic acid, a combination of a polyamide-type textile fabric or nonwoven fabric and methacrylic acid, a combination of a polyamide-type textile fabric or nonwoven fabric and 2-hydroxyethyl acrylate, a polyamide-type textile fabric or nonwoven fabric and 2-hydroxyethyl methacrylate, a combination of a polyamide-type textile fabric or nonwoven fabric and N-vinyl-2-pyrrolidone, a combination of a polypropylene-type textile fabric or nonwoven fabric and acrylic acid, a combination of a polypropylene-type textile fabric or nonwoven fabric and methacrylic acid, a combination of a polypropylene-type textile fabric or nonwoven fabric and 2-hydroxyethyl acrylate, a combination of a polypropylene-type textile fabric or nonwoven fabric and 2-hydroxyethyl methacrylate, and a combination of a polypropylene-type textile fabric or nonwoven fabric and N-vinyl-2-pyrrolidone. Of these combinations, the combination of the polyester-type textile fabric or nonwoven fabric and acrylic acid is especially preferable.

Preferable examples of a hydrophilic textile fabric or nonwoven fabric and a hydrophobic composition include a combination of a cotton-type textile fabric or nonwoven fabric and perfluorooctylethyl acrylate, and a combination of a cotton-type textile fabric or nonwoven fabric and perfluorooctylethyl methacrylate.

In one embodiment, the fabric is a cotton, or cotton-type fabric blend. Such material can be cotton fibers or a blend of cotton and synthetic fibers. As discussed herein, cotton and cotton blends are fabrics or materials what have at least about 20% cotton by weight.

Suitable woven and non-woven fabrics comprise, for example, "Cotton containing fabric", "Cellulose-containing fabric" and hydrophobic polymers.

"Cotton-containing fabric" means sewn or unsewn, woven or non-woven fabrics made of pure cotton or cotton blends including cotton woven fabrics, cotton knits, cotton denims, cotton yarns and the like. When cotton blends are employed, the amount of cotton in the fabric should be at least about 40 percent by weight cotton; preferably, more than about 60 percent by weight cotton; and most preferably, more than about 75 percent by weight cotton. When employed as blends, the companion material employed in the fabric can include one or more non-cotton fibers including synthetic fibers such as polyamide fibers (for example, nylon 6 and nylon 66), acrylic fibers (for example, polyacrylonitrile fibers), and polyester fibers (for example, polyethylene terephthalate), polyvinyl alcohol fibers (for example, VINYLON), polyvinyl chloride fibers, polyvinylidene chloride fibers, polyurethane fibers, polyurea fibers and aramide fibers.

"Cellulose containing fabric" means any cotton or noncotton containing cellulosic fabric or cotton or non-cotton containing cellulose blend including natural cellulosics and manmade cellulosics (such as Jute, flax, ramie, rayon, and the like). Included under the heading of manmade cellulose containing fabrics are regenerated fabrics that are well known in the art such as rayon. Other manmade cellulose containing fabrics include chemically modified cellulose fibers (e.g., cellulose derivatized by acetate) and solvent-spun cellulose fibers (e.g., lyocell). Of course, included within the definition of cellulose containing fabric is any garment or yarn made of such materials. Similarly, "cellulose containing fabric" includes textile fibers made of such materials.

In one embodiment, the fabric substrate consists essentially of, and more typically consists of, fibers that each have a hydrophobic surface, such as for example, a fabric comprising 100% poly(olefin) fibers.

In an alternate embodiment, the fabric substrate comprises a blend of fibers that each have a hydrophobic surface and other fibers, such as, for example cellulosic fibers. Typically, such blends comprise greater than or equal to 50% fibers having hydrophobic surfaces and less than or equal to 50% other fibers, such as for example a blend of 50% poly(olefin) fibers and 50% cotton fibers.

In one embodiment, hydrophilized fabric of the present invention comprises a porous nonwoven fabric that consists of fibers having hydrophobic surfaces, more typically, a porous nonwoven fabric of poly(olefin) fibers, even more typically a porous nonwoven fabric of poly(propylene) fibers, and a hydrophilizing layer disposed on at least a portion of the surfaces of the fibers of such porous nonwoven fabric.

In one embodiment, a woven or non-woven fabric comprising fibers having hydrophobic surfaces repels water and a drop of water deposited on the woven or non-woven fabric does not penetrate the woven or non-woven fabric within a time of less than or equal to about 60 seconds and the corresponding hydrophilized woven or non-woven fabric is penetrated by a drop of water deposited on the fabric in a time of less than or equal to about 60 seconds.

In one embodiment, the hydrophilized fiber substrate is durable, in the sense that at least a portion of the organophosphorus compound remains on the surfaces of the one or more fibers of the fiber substrate when the hydrophilized fiber substrate is contacted with an aqueous medium. One aspect of the durability of the hydrophilic properties of hydrophilized fiber substrate of the present invention can be evaluated by rinsing the hydrophilized fiber substrate in water and measuring the surface tension of rinse water. In one embodiment of the hydrophilized fiber substrate, the rinse water exhibits a surface tension of from about 20 to about 70 milliNewtons per meter (mN/m), more preferably from about 25 to about 70 mN/m, as determined according to American Society for Testing and Materials test no. ASTM 1331 using a Wilhemy plate (Kruss Instruments). In a preferred embodiment, the fabric is rinsed according to the following procedure:

place a 20×18 cm sample of hydrophilized fabric in 40 milliliters of a 0.909 wt % NaCl aqueous solution,
then stir the fabric in the solution for 10 seconds,
then allow the fabric to sit without any agitation for 5 minutes,
then stir the fabric in the solution for 10 seconds,
then remove the fabric from the solution, and
then allow the solution to rest for 10 minutes prior to making the surface tension measurement.

Organophosphorous Material

As used herein, the term "alkyl" means a monovalent saturated straight chain or branched hydrocarbon radical, typically a monovalent saturated $(C_1-C_{30})$hydrocarbon radical, such as for example, methyl, ethyl, n-propyl, iso-propyl, n-butyl, sec-butyl, t-butyl, pentyl, or n-hexyl, which may optionally be substituted on one or more of the carbon atoms of the radical. In one embodiment, an alkyl radical is substituted on one or more carbon atoms of the radical with alkoxy, amino, halo, carboxy, or phosphono, such as, for example, hydroxymethyl hydroxyethyl, methoxymethyl, ethoxymethyl, isopropoxyethyl, aminomethyl, chloromethyl or trichloromethyl, carboxyethyl, or phosphonomethyl.

As used herein, the term "hydroxyalkyl" means an alkyl radical that is substituted on one of its carbon atoms with a hydroxyl group.

As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "cylcoalkyl" means a saturated cyclic hydrocarbon radical, typically a $(C_3-C_8)$ saturated cyclic hydrocarbon radical, such as, for example, cyclohexyl or cyclooctyl, which may optionally be substituted on one or more of the carbon atoms of the radical.

As used herein, the term "alkenyl" means an unsaturated straight chain, branched chain, or cyclic hydrocarbon radical that contains one or more carbon-carbon double bonds, such as, for example, ethenyl, 1-propenyl, or 2-propenyl, which may optionally be substituted on one or more of the carbon atoms of the radical.

As used herein, the term "aryl" means a monovalent unsaturated hydrocarbon radical containing one or more six-membered carbon rings in which the unsaturation may be represented by three conjugated double bonds, such as for example, phenyl, naphthyl, anthryl, phenanthryl, or biphenyl, which may optionally be substituted one or more of carbons of the ring. In one embodiment, an aryl radical is substituted on one or more carbon atoms of the radical with hydroxyl, alkenyl, halo, haloalkyl, or amino, such as, for example, methylphenyl, dimethylphenyl, hydroxyphenyl, chlorophenyl, trichloromethylphenyl, or aminophenyl.

As used herein, the term "aryloxy" means an oxy radical that is substituted with an aryl group, such as for example, phenyloxy, methylphenyl oxy, isopropylmethylphenyloxy.

As used herein, the indication that a radical may be "optionally substituted" or "optionally further substituted" means, in general, that is unless further limited, either explicitly or by the context of such reference, that such radical may be substituted with one or more inorganic or organic substituent groups, such as, for example, alkyl, alkenyl, aryl, aralkyl, alkaryl, a hetero atom, or heterocyclyl, or with one or more functional groups that are capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

As used herein, the terminology "$(C_x\text{-}C_y)$" in reference to an organic group, wherein x and y are each integers, indicates that the group may contain from x carbon atoms to y carbon atoms per group.

In one embodiment, $R^6$ and $R^8$ are each and each $R^7$ is independently H, $(C_1\text{-}C_{30})$alkyl, $(C_1\text{-}C_{30})$alkenyl, or $(C_7\text{-}C_{30})$alkaryl.

In one embodiment, each $R^1$ and each $R^2$ is O, and the organophosphorus compound is selected from:

(II)(1) an organophosphate ester according to structure (II):

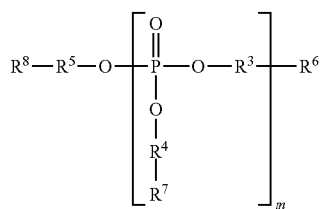

(II)

wherein $R^3$, $R^4$, $R^5$, $R^6$, $R^7$, $R^8$, and m are each as described above, (II)(2) salts of organophosphorus compounds according to structure (II), (II)(3) condensation reaction products of two or more molecules of one or more organophosphorus compounds according to structure (II), and (II)(4) mixtures comprising two or more of the compounds, salts, and/or reaction products of (II)(1), (II)(2), and (II)(3).

In one embodiment, each $R^1$ is absent, each $R^2$ is O, and the organophosphorus compound is selected from:

(III)(1) an organophosphonate ester according to structure (III):

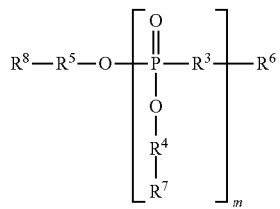

(III)

wherein $R^3$, $R^4$, $R^5$, $R^6$, $R^7$, $R^8$, and m are each as described above, (III)(2) salts of organophosphorus compounds according to structure (III), (III)(3) condensation reaction products of two or more molecules of one or more organophosphorus compounds according to structure (III), and (III)(4) mixtures comprising two or more of the compounds, salts, and/or reaction products of (III)(1), (III)(2), and (III)(3).

In one embodiment, each $R^1$ is O, each $R^2$ is absent, and the organophosphorus compound is selected from:

(IV)(1) an organophosphonate ester according to structure (IV):

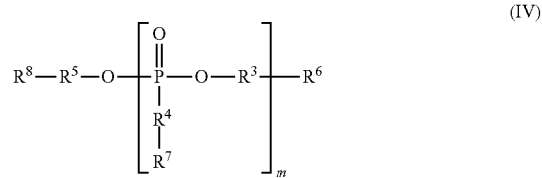

(IV)

wherein $R^3$, $R^4$, $R^5$, $R^6$, $R^7$, $R^8$, and m are each as described above, (IV)(2) salts of organophosphorus compounds according to structure (IV), (IV)(3) condensation reaction products of two or more molecules of one or more organophosphorus compounds according to structure (IV), and (IV)(4) mixtures comprising two or more of the compounds, salts, and/or reaction products of (IV)(1), (IV)(2), and (IV)(3).

In one embodiment, each $R^3$ is a divalent radical according to structure (V), (VI), (VII), or (VIII):

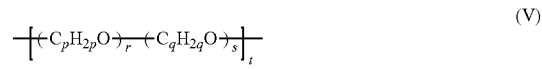

(V)

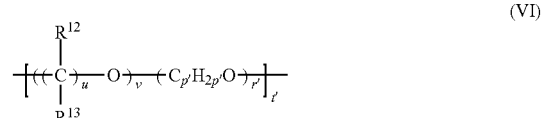

(VI)

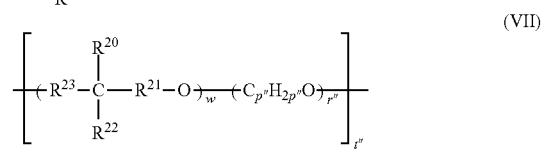

(VII)

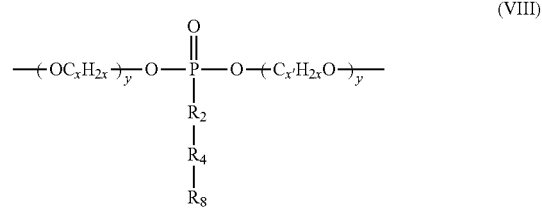

(VIII)

wherein:

each $R^{12}$ and each $R^{13}$ is independently H, hydroxyl, alkyl, hydroxyalkyl, alkoxy, alkenyl, aryl, aryloxy, or two $R^{12}$ groups that are attached to the adjacent carbon atoms may be fused to form, together with the carbon atoms to which they are attached, a $(C_6\text{-}C_8)$hydrocarbon ring, $R^{20}$ is H, hydroxyl, alkyl, hydroxyalkyl, alkoxy, alkenyl, aryl, or aryloxy $R^{22}$ is hydroxyl or hydroxyalkyl, provided that $R^{20}$ and $R^{22}$ are not each hydroxyl, $R^{23}$ and $R^{21}$ are each independently methylene or poly (methylene), p, p', p", q, and x are each independently integers of from 2 to 5, each r, s, r', r", and y is independently a number of from 0 to 25, provided that at least one of r and s is not 0, u is an integer of from 2 to 10, v and w are each numbers of from 1 to 25, and t, t', and t" are each numbers of from 1 to 25, provided that the product of the quantity (r+s) multiplied times t is less than or equal to about 100, the product of the quantity (v+r') multiplied times t' is less than or equal to about 100, and the product of the quantity (w+r") multiplied time t" is less than or equal to about 100.

In one embodiment, each $R^4$ and each $R^5$ is independently absent or a divalent radical according to structure (V), (VI), or (VII), wherein $R^{12}$, $R^{13}$, $R^{20}$, $R^{21}$, $R^{22}$, $R^{23}$, p, p', p", q, r, r', r", s, t, t", t, u, v, w, x, and y are as described above.

In one embodiment, each $R^3$ is independently a divalent radical according to structure (V), (VI), or (VII) wherein $R^{12}$, $R^{13}$, $R^{20}$, $R^{21}$, $R^{22}$, $R^{23}$, p, p', p", q, r, r', r", s, t, t", t, u, v, w, x, and y are as described above, and $R^4$ and $R^5$ are each independently absent or $R^3$.

In one embodiment, each $R^3$ is independently a divalent radical according to structure (V), wherein p is 2, 3, or 4, r is an integer from 1 to 25, s is 0, t is an integer of from 1 to 2, and $R^4$ and $R^5$ are each independently absent or $R^3$.

In one embodiment, each $R^3$ is independently a divalent radical according to structure (VI), wherein the $R^{12}$ groups are fused to form, including the carbon atoms to which they are attached, a ($C_6$-$C_8$) hydrocarbon ring, each $R^{13}$ is H, p' is 2 or 3, u is 2, v is an integer of from 1 to 3, r' is an integer from 1 to 25, t' is an integer of from 1 to 25, the product of the quantity (v+r') multiplied times t" is less than or equal to about 100, more typically less than or equal to about 50, and $R^4$ and $R^5$ are each independently absent or $R^3$.

In one embodiment, each $R^3$ is independently a divalent radical according to structure (VII), wherein $R^{20}$ is hydroxyl or hydroxyalkyl, $R^{22}$ is H, alkyl, hydroxyl, or hydroxyalkyl, provided that $R^{20}$ and $R^{22}$ are not each hydroxyl, $R^{21}$ and $R^{23}$ are each independently methylene, di(methylene), or tri(methylene), w is 1 or 2, p" is 2 or 3, r" is an integer of from 1 to 25, t" is an integer of from 1 to 25, the product of the quantity (w+r") multiplied times t" is less than or equal to about 100, more typically less than or equal to about 50, and $R^4$ and $R^5$ are each independently absent or $R^3$.

In one embodiment of the organophosphorus compound according to structure (II)

$R^6$ and $R^8$ are each and each $R^7$ is independently H or ($C_1$-$C_{30}$)hydrocarbon, which hydrocarbon may optionally be substituted on one or more carbon atoms by hydroxyl, fluorine, alkyl, alkenyl or aryl and/or interrupted at one or more sites by an O, N, or S heteroatom, or —$POR^9R^{10}$, more typically, $R^6$, $R^8$, and each $R^7$ are each H, $R^4$ and $R^5$ are each absent, each $R^3$ is independently a divalent radical according to structure (V), (VI), or (VII), and m is an integer of from 1 to 5.

In one embodiment of the organophosphorus compound according to structure (II):

$R^6$, $R^8$, and each $R^7$ are each H, $R^4$ and $R^5$ are each absent, each $R^3$ is independently a divalent radical according to structure (V), each p is independently 2, 3, or 4, more typically 2 or 3, each r is independently a number of from 1 to about 100, more typically from 2 to about 50, each s is 0, each t is 1, and m is an integer of from 1 to 5.

In one embodiment, the organophosphorus material is selected from:

(X)(1) organophosphorus compounds according to structure (IX):

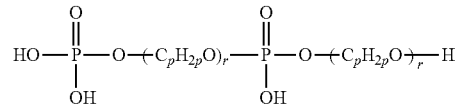

wherein:

p is 2, 3, or 4, more typically 2 or 3, r is a number of from 4 to about 50, (IX)(2) salts organophosphorus compounds according to structure (IX), and (IX)(3) mixtures comprising two or more of the compounds and/or salts of (IX)(1) and (IX)(2).

In one embodiment of the organophosphorus compound according to structure (II):

$R^6$, $R^8$, and each $R^7$ are each H, $R^4$ and $R^5$ are each absent, each $R^3$ is independently a divalent radical according to structure (VI), the $R^{12}$ groups are fused to form, including the carbon atoms to which they are attached, a ($C_6$-$C_8$)hydrocarbon ring, each $R^{13}$ is H p' is 2 or 3, u is 2, v is 1, r' is a number of from 1 to 25, t' is a number of from 1 to 25, the product of the quantity (v+r') multiplied times t' is less than or equal to about 100, and m is an integer of from 1 to 5.

In one embodiment of the organophosphorus compound according to structure (II):

$R^6$, $R^8$, and each $R^7$ are each H, $R^4$ and $R^5$ are each absent, each $R^3$ is independently a divalent radical according to structure (VII), $R^{20}$ is hydroxyl or hydroxyalkyl, $R^{22}$ is H, alkyl, hydroxyl, or hydroxyalkyl, $R^{23}$ and $R^{21}$ are each independently methylene, di(methylene), or tri(methylene), w is 1 or 2, p" is 2 or 3, r" is a number of from 1 to 25, t" is a number of from 1 to 25 the product of the quantity (w+r") multiplied times t" is less than or equal to about 100, and m is an integer of from 1 to 5.

In one embodiment, the organophosphorus compound is according to structure (III), each $R^3$ is a divalent radical according to structure (V) with s=0 and t=1, $R^4$ and $R^5$ are each absent, and $R^6$, $R^7$, and $R^8$ are each H.

In one embodiment, the organophosphorus compound is according to structure (IV), wherein R3 and R5 are each according to structure (V), with s=0 and t=1, and $R^6$ and $R^8$ are each H.

In one embodiment, the organophosphorus material (b)(I) comprises a condensation reaction product of two or more molecules according to structure (I).

In one embodiment, the organophosphorus material (b)(I) comprises a condensation reaction product of two or more molecules according to structure (I) in the form of a linear molecule, such as, for example, a linear condensation reaction product according to structure (X), formed by condensation of a molecule according to structure (II) with a molecule according to structure (IV):

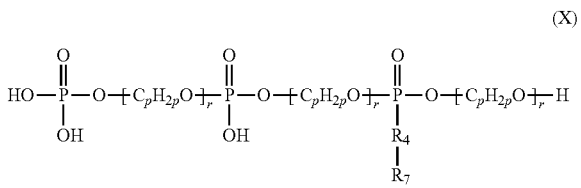

(X)

wherein $R^4$, $R^7$, p, r are each as described above.

In one embodiment, the organophosphorus material (b)(I) comprises a condensation reaction product of two or more molecules according to structure (I) in the form of a crosslinked network. A portion of an exemplary crosslinked condensation reaction product network is illustrated by structure (XI):

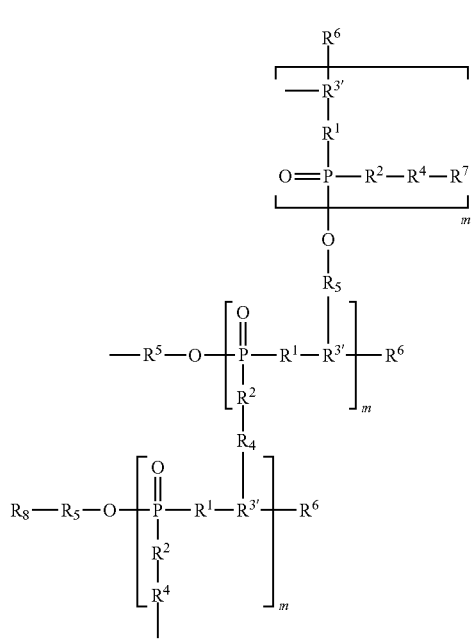

wherein $R^1$, $R^2$, $R^4$, $R^5$, $R^6$, $R^7$, $R^8$, and m are each as described above, and each $R^{3'}$ is independently a residue of an $R^3$ group of a compound according to structure (I), as described above, wherein the $R^3$ group is a alkyleneoxy or poly(alkyleneoxy) moiety substituted with hydroxyl-, hydroxyalkyl-, hydroxyalkyleneoxy- or hydroxypoly(alkyleneoxy)- on one or more carbon atoms of the alkyleneoxy or poly(alkyleneoxy) moiety, and —$R^{3'}$—$R_4$— and —$R^{3'}$—$R^5$— each represent a respective linkage formed by condensation of such an $R^3$ group and a —$R^{3'}$—$R^5$— or $R^8$—$R^5$— group of molecules of another molecule of a compound according to structure (I).

In one embodiment, the organophosphorus material (b)(I) comprises a condensation reaction product of two or more molecules according to structure (I) and the condensation reaction product forms a covalently crosslinked organophosphorus network. Typically the solubility of the covalently crosslinked organophosphorus network in water is less than that of the organophosphorus compound according to structure (I), more typically, the covalently crosslinked organophosphorus network is substantially insoluble in water.

As used herein, the term "salts" refers to salts prepared from bases or acids including inorganic or organic bases and inorganic or organic acids.

In one embodiment, the organophosphorus material (b)(I) is in the form of a salt that comprises an anion derived (for example, by deprotonation of a hydroxyl or a hydroxyalkyl substituent) from of an organophosphorus compound according to structure (I) and one or more positively charged counterions derived from a base.

Suitable positively charged counterions include inorganic cations and organic cations, such as for example, sodium cations, potassium cations, calcium cations, magnesium cations, copper cations, zinc cations, ammonium cations, tetraalkylammonium cations, as well as cations derived from primary, secondary, and tertiary amines, and substituted amines.

In one embodiment, the cation is a monovalent cation, such as for example, $Na^+$, or $K^+$.

In one embodiment, the cation is a polyvalent cation, such as, for example, $Ca^{+2}$, $Mg^{+2}$, $Zn^{+2}$, $Mn^{+2}$, $Cu^{+2}$, $Al^{+3}$, $Fe^{+2}$, $Fe^{+3}$, $Ti^{+4}$, $Zr^{+4}$, in which case the organophosphorus compound may be in the form of a "salt complex" formed by the organophosphorus compound and the polyvalent cation. For organophosphorus compound having two or more anionic sites, e.g., deprotonated hydroxyl substituents, per molecule, the organophosphorus compound-polyvalent cation complex can develop an ionically crosslinked network structure. Typically the solubility of the ionically crosslinked organophosphorus network in water is less than that of the organophosphorus compound according to structure (I), more typically, the ionically crosslinked organophosphorus network is substantially insoluble in water.

Suitable organophosphorus compounds can be made by known synthetic methods, such as by reaction of one or more compounds, each having two or more hydroxyl groups per molecule, with phosphoric acid, polyphosphoric acid, and or phosphoric anhydride, such as disclosed, for example, in U.S. Pat. Nos. 5,550,274, 5,554,781, and 6,136,221.

In one embodiment, cations are immobilized on a water insoluble substrate to form a water insoluble cationic particle and the hydrophilizing layer further comprises cationic particles. Suitable substrates include inorganic oxide particles, including for example, oxides of single elements, such as cerium oxide, titanium oxide, zirconium oxide, halfnium oxide, tantalum oxide, tungsten oxide, silicon dioxide, and bismuth oxide, zinc oxide, indium oxide, and tin oxide, and mixtures of such oxides, as well as oxides of mixtures of such elements, such as cerium-zirconium oxides. Such particle may exhibit a mean particle diameter ("$D_{50}$") of from about 1 nanometer ("nm") to about 50 micrometers ("µm"), more typically from about 5 to about 1000 nm, even more typically from about 10 to about 800 nm, and still more typically from about 20 to about 500 nm, as determined by dynamic light scattering or optical microscopy. In one embodiment, aluminum cations are immobilized on silica particles.

Vinyl Alcohol

In one embodiment, the hydrophilizing layer further comprises a vinyl alcohol material (b)(II).

In one embodiment, which offers improved solubility in water and improved processability, the vinyl alcohol material (b)(II) comprises a polymer that comprises monomeric units according to structure (I-a) (a "vinyl alcohol polymer"), in addition to the organophosphate as discussed above.

In one embodiment, the vinyl alcohol polymer and exhibits a weight average molecular weight of greater than or equal to about 10,000, more typically from about 10,000 to about 100,000, even more typically from about 10,000 to about 30,000. In an alternative embodiment, which offers improved durability, the vinyl alcohol polymer a weight average molecular weight of greater than or equal to about 100,000, more typically form about 100,000 to about 200,000. In another embodiment, which offers a balance between processability and durability, the vinyl alcohol polymer exhibits a weight average molecular weight of greater than or equal to about 50,000, more typically from about 50,000 to about 150,000, even more typically from about 80,000 to about 120,000.

In one embodiment, the vinyl alcohol polymer is made by polymerizing a vinyl ester monomer, such as for example, vinyl acetate, to form a polymer, such as a poly(vinyl acetate) homopolymer or a copolymer comprising monomeric units derived from vinyl acetate, having a hydrocarbon backbone and ester substituent groups, and then hydrolyzing at least a portion of the ester substituent groups of the polymer to form hydroxy-substituted monomeric units according to structure (I-a). In one embodiment, which offers improved solubility in water and improved processability, the vinyl alcohol polymer exhibits a degree of hydrolysis of greater than or equal to about 88%, more typically from about 88% to about 95%. As used herein in reference to a vinyl alcohol polymer that is made by hydrolyzing a polymer initially having a hydrocarbon backbone and ester substituent groups, the term "degree of hydrolysis" means the relative amount, expressed as a percentage, of vinyl ester-substituted monomeric units that were hydrolyzed to form hydroxy-substituted monomeric units. In another embodiment, which offers improved solubility in water and improved durability, the vinyl alcohol polymer exhibits a degree of hydrolysis of greater than or equal to about 99%. In yet another embodiment, which offers a compromise between solubility in water and durability, the polymer exhibits a degree of hydrolysis from about 92 to about 99%.

In one embodiment, the vinyl alcohol polymer has a linear polymeric structure. In an alternative embodiment, the vinyl alcohol polymer has a branched polymeric structure.

In one embodiment, the vinyl alcohol polymer is a vinyl alcohol homopolymer that consists solely of monomeric units according to structure (I-a).

In one embodiment, the vinyl alcohol polymer is a vinyl alcohol copolymer that comprises monomeric units having a structure according to structure (I-a) and further comprises comonomeric units having a structure other than structure (I-a). In one embodiment, the vinyl alcohol polymer is a copolymer that comprises hydroxy-substituted monomeric units according to (I-a) and ester substituted monomeric units and is made by incomplete hydrolysis of a vinyl ester homopolymer.

In one embodiment a vinyl alcohol copolymer comprises greater than or equal to about 50 mole % ("mol %"), more typically greater or equal to than about 80 mol %, monomeric units according to structure (I-a) and less than about 50 mol %, more typically less than about 20 mol %, comonomeric units having a structure other than structure (I-a).

As described above, vinyl alcohol polymers having monomeric units according to structure (I-a) are typically derived from polymerization of vinyl ester monomers and subsequent hydrolysis of vinyl ester-substituted monomeric units of the polymer. Suitable vinyl alcohol copolymers are typically derived by copolymerization of the vinyl ester monomer with any ethylenically unsaturated monomer that is copolymerizable with the vinyl ester monomer, including for example, other vinyl monomers, allyl monomers, acrylic acid, methacrylic acid, acrylic ester monomers, methacrylic ester monomers, acrylamide monomers, and subsequent hydrolysis of at least a portion of the ester-substituted monomeric units to form hydroxy-substituted monomeric units according to structure (I-a).

In one embodiment, the vinyl alcohol polymer comprises monomeric units according to structure (I-a) and further comprises hydrophilic monomeric units other than the monomeric according to structure (I-a). As used herein, the term "hydrophilic monomeric units" are those wherein homopolymers of such monomeric units are soluble in water at 25° C. at a concentration of 1 wt % homopolymer, and include, for example, monomeric units derived from, for example, hydroxy($C_1$-$C_4$)alkyl(meth)acrylates, (meth)acrylamide, ($C_1$-$C_4$)alkyl(meth)acrylamides, N,N-dialkyl-acrylamides, alkoxylated (meth)acrylates, poly(ethylene glycol)-mono methacrylates and poly(ethyleneglycol)-monomethylether methacrylates, hydroxy($C_1$-$C_4$)acrylamides and methacrylamides, hydroxyl($C_1$-$C_4$)alkyl vinyl ethers, N-vinylpyrrole, N-vinyl-2-pyrrolidone, 2- and 4-vinylpyridine, ethylenically unsaturated carboxylic acids having a total of 3 to 5 carbon atoms, amino($C_1$-$C_4$)alkyl, mono($C_1$-$C_4$)alkylamino($C_1$-$C_4$)alkyl, and di($C_1$-$C_4$)alkylamino($C_1$-$C_4$)alkyl(meth)acrylates, allyl alcohol, dimethylaminoethyl methacrylate, dimethylaminoethylmethacrylamide.

In one embodiment, the vinyl alcohol polymer comprises monomeric units according to structure (I-a) and further comprises hydrophobic monomeric units. As used herein, the term "hydrophobic monomeric units" are those wherein homopolymers of such monomeric units are insoluble in water at 25° C. at a concentration of 1 wt % homopolymer, and include, for example, monomeric units derived from ($C_1$-$C_{18}$)alkyl and ($C_5$-$C_{18}$)cycloalkyl(meth)acrylates, ($C_5$-$C_{18}$)alkyl(meth)acrylamides, (meth)acrylonitrile, vinyl($C_1$-$C_{18}$)alkanoates, ($C_2$-$C_{18}$)alkenes, ($C_2$-$C_{18}$)haloalkenes, styrene, ($C^1$—$C_6$)alkylstyrenes, ($C_4$-$C_{12}$)alkyl vinyl ethers, fluorinated ($C_2$-$C_{10}$)alkyl(meth)acrylates, ($C_3$-$C_{12}$)perfluoroalkylethylthiocarbonylaminoethyl(meth)acrylates, (meth)acryloxyalkylsiloxanes, N-vinylcarbazole, ($C_1$-$C_{12}$)alkyl maleic, fumaric, itaconic, and mesaconic acid esters, vinyl acetate, vinyl propionate, vinyl butyrate, vinyl valerate, chloroprene, vinyl chloride, vinylidene chloride, vinyltoluene, vinyl ethyl ether, perfluorohexyl ethylthiocarbonylaminoethyl methacrylate, isobornyl methacrylate, trifluoroethyl methacrylate, hexa-fluoroisopropyl methacrylate, hexafluorobutyl methacrylate, tristrimethylsilyloxysilylpropyl methacrylate, and 3-methacryloxypropylpentamethyldisiloxane.

As used herein, the term "(meth)acrylate" means acrylate, methacrylate, or acrylate and methacrylate and the term (meth)acrylamide" means acrylamide, methacrylamide or acrylamide and methacrylamide.

In one embodiment, the polymer comprising monomeric units according to structure (I-a) a random copolymer. In another embodiment, the copolymer comprising monomeric units according to structure (I-a) is a block copolymer.

Methods for making suitable vinyl alcohol polymers are known in the art. In one embodiment, a polymer comprising monomeric units according to structure (I-a) is made by polymerizing one or more ethylenically unsaturated monomers, comprising at least one vinyl ester monomer, such vinyl acetate, by known free radical polymerization processes and subsequently hydrolyzing at least a portion of the vinyl ester monomeric units of the polymer to make a polymer having the desired degree of hydrolysis. In another embodiment, the polymer comprising monomeric units according to structure (I-a) is a copolymer made by known controlled free radical polymerization techniques, such as reversible addition fragmentation transfer (RAFT), macromolecular design via interchange of xanthates (MADIX), or atom transfer reversible polymerization (ATRP).

In one embodiment, the vinyl alcohol polymer is made by known solution polymerization techniques, typically in an aliphatic alcohol reaction medium.

In another embodiment, the vinyl alcohol polymer is made by known emulsion polymerization techniques, in the presence of one or more surfactants, in an aqueous reaction medium.

In one embodiment, the vinyl alcohol material comprises a microgel made by crosslinking molecules of a vinyl alcohol polymer.

In one embodiment the vinyl alcohol material comprises a salt, such as a sodium or potassium salt, of a vinyl alcohol polymer.

In one embodiment, the hydrophilizing layer comprises one or more poly(vinyl alcohol) polymers, in addition to an organophosphorus material. Poly(vinyl alcohol) polymers are manufactured commercially by the hydrolysis of poly(vinyl acetate). In one embodiment, the poly(vinyl alcohol) has a molecular weight of greater than or equal to about 10,000 (which corresponds approximately to a degree of polymerization of greater than or equal to about 200), more typically from about 20,000 to about 200,000 (which corresponds approximately to a degree of polymerization of from about 400 to about 4000, wherein the term "degree of polymerization" means the number of vinyl alcohol units in the poly(vinyl alcohol) polymer. In one embodiment, the poly(vinyl alcohol) has a degree of hydrolysis of greater than or equal about 50, more typically greater than or equal about 88%.

In one embodiment, the hydrophilizing layer comprises an organophosphorus material (b)(I) and a vinyl alcohol material (b)(II), more typically, based on 100 pbw of the hydrophilizing layer, from greater than 0 pbw to less than 100 pbw, more typically from about 0.1 pbw to about 99.9 pbw, and even more typically from about 1 pbw to about 99 pbw, organophosphorus material (b)(I), from greater than 0 pbw to less than 100 pbw, more typically from about 0.1 pbw to about 99.9 pbw, and even more typically from about 1 pbw to about 99 pbw, vinyl alcohol material (b)(II).

Liquid Carrier

In one embodiment, the treatment composition of the present invention comprises an organophosphorus material (b)(I) and a vinyl alcohol material (b)(II) and a liquid carrier.

In one embodiment, the treatment composition of the present invention comprises the organophosphorus material (b)(I) and a liquid carrier, i.e., without the vinyl alcohol material.

In one embodiment, the liquid carrier is an aqueous carrier comprising water and the treatment solution is in the form of a solution, emulsion, or dispersion of the organophosphorus material and additives. In one embodiment, the liquid carrier comprises water and a water miscible organic liquid. Suitable water miscible organic liquids include saturated or unsaturated monohydric alcohols and polyhydric alcohols, such as, for example, methanol, ethanol, isopropanol, cetyl alcohol, benzyl alcohol, oleyl alcohol, 2-butoxyethanol, and ethylene glycol, as well as alkylether diols, such as, for example, ethylene glycol monoethyl ether, propylene glycol monoethyl ether and diethylene glycol monomethyl ether.

In one embodiment, the treatment composition comprises, based on 100 parts by weight ("pbw") of the composition, from about 0.1 to about 20 pbw, more typically, from about 1 to about 5 pbw, organophosphorus material, and from about 80 to 99 pbw, more typically, from about 90 to about 98 pbw, liquid carrier.

In one embodiment, the treatment composition further comprises, based on 100 parts by weight ("pbw") of the composition, from about 0.01 to about 10 pbw, more typically, from about 0.1 to about 5 pbw colloidal inorganic particles.

In one embodiment, the treatment composition further comprises, based on 100 parts by weight ("pbw") of the composition, from about 0.01 to about 2 pbw, more typically, from about 0.1 to about 0.5 pbw poly(vinyl alcohol).

In one embodiment, the treatment composition further comprises and from about 0.0001 to about 1 pbw, more typically, from about 0.001 to about 0.1 pbw multivalent cationic particles.

In one embodiment, the treatment composition of the present invention comprises an organophosphorus material (b)(I) and a vinyl alcohol material (b)(II) and a liquid carrier.

In one embodiment, the treatment composition comprises, based on 100 parts by weight ("pbw") of the composition, from about 0.1 to about 20 pbw, more typically, from about 1 to about 5 pbw, organophosphorus material (b)(I), from about 0.1 to about 20 pbw, more typically, from about 1 to about 5 pbw, vinyl alcohol material (b)(II), and from about 80 to 99 pbw, more typically, from about 90 to about 98 pbw, liquid carrier.

Treatment Compositions/Methods

The treatment composition may optionally further comprise, based on 100 pbw weight of the composition up to about 10 pbw of other components, such as, salts, sugars, surfactants, and rheology modifiers. Suitable salts include, for example, NaCl, KCl, $NH_4Cl$, $N(C_2H_5)_3Cl$. Suitable sugars include monosaccharides and polysaccharides, such as, for example, glucose or guar gum. Suitable rheology modifiers include, for example, alkali swellable polymers, such as acrylic acid polymers, hydrogen bridging rheology modifiers, such as carboxymethylcellulose or hydroxyethylcellulose, and hydrophobic associative thickeners, such as hydrophobically modified cellulose derivatives and hydrophobically modified alkoxylated urethane polymers.

In one embodiment, the hydrophilizing layer is deposited on at least a portion of the hydrophobic surface of a substrate by contacting the surface with a treatment solution comprising the organophosphorus material and a liquid carrier and then removing the liquid carrier. In one embodiment, the liquid carrier is a volatile liquid carrier and the carrier is removed by allowing the carrier to evaporate.

The hydrophobic surface of substrate may be contacted with the treatment composition by any convenient method such as, for example, by immersing the fiber substrate in the treatment composition or by applying the treatment composition to the surface of the substrate by brushing or spraying.

In one embodiment, the hydrophilizing layer is deposited on the hydrophobic surfaces of hydrophobic fibers by treating discrete fibers with treatment composition and the treated fibers are subsequently included as a component of a fabric. In another, more typical embodiment, a fabric comprising fibers having hydrophobic surfaces is made and hydrophilizing layer is deposited on the hydrophobic surfaces of the fibers of the fabric by treating the fabric with the treatment composition.

In one embodiment, the hydrophilizing layer is deposited on at least a portion of the surfaces of a fiber or of the fibers of a fibers of a fabric by immersing the fiber or fabric in an aqueous treatment composition comprising the organophosphorus material and an aqueous carrier and then removing the aqueous carrier by evaporation to leave an amount of hydrophilizing layer disposed on at least a portion of the surfaces of the fiber or the fibers of the fabric.

In one embodiment, the hydrophilizing layer disposed on at least a portion of the hydrophobic surface of the substrate in an amount, typically from about 0.0001 gram to about 10 grams hydrophilizing layer per square meter of surface area, effective to decrease the hydrophobicity of the portion of the surface.

In one embodiment, the hydrophilized fiber of the present invention comprises from about 0.001 to about 1, more typically from about 0.02 to about 0.2 grams of the hydrophilizing layer per gram of fabric.

In one embodiment, the hydrophilized fiber of the present invention comprises from about 0.017 to about 17, more typically from about 0.17, to about 3 grams of the hydrophilizing layer per square meter of fabric.

In one embodiment, the hydrophilized substrate of the present invention is a woven or nonwoven fabric comprising fibers having hydrophobic surfaces, such as, for example, hydrophobic synthetic polymeric fibers, such as poly(olefin) fibers, and a hydrophilizing layer disposed on at least a portion of the surfaces of such fibers in an amount effective to render the fabric sufficiently hydrophilic to allow the fabric to absorb aqueous media. As used herein, terms "aqueous medium" and "aqueous media" are used herein to refer to any liquid medium of which water is a major component. Thus, the term includes water per se as well as aqueous solutions and dispersions. For example, the aqueous medium may be a liquid bodily discharge, such as urine, menses, and saliva.

"Strikethrough" Test

One aspect of the increased hydrophilicity of the hydrophilized fiber substrate of the present invention can be evaluated by a "strikethrough" test. In one embodiment, the hydrophilized fabric, exhibits a strikethrough time, as determined according to European Disposable and Nonwovens Association test no. EDANA 150.3-96 of from less than about 10 seconds, more preferably from about 2 to about 5 seconds, and still more preferably from about 2 to about 4 seconds. In a preferred embodiment, the strikethrough time is measured according to the following procedure:

place a 12×12 cm sample of the hydrophilized fiber on top of a stack of 10 filter papers (ERT-FF3) and under a 50 mL separating funnel, then place a conductivity electrode on top of the stack of filter papers and under the treated fabric, deliver a 5 mL aliquot of an aqueous 0.909 wt % NaCl solution from a burette to the funnel (a "gush") and measuring the time (the "strikethrough time") from the moment the liquid touches the fabric until all liquid disappears into the stack of filter papers, optionally, repeating step (C) multiple times using the same fabric sample and stack of filter papers and recording the strikethrough time for each gush.

In one embodiment, the disposable absorbent article of the present invention has a composite laminate structure and comprises one or more layers of a hydrophilized porous nonwoven fabric according to the present invention and one or more layers of a nonporous polymer film, such as a nonporous poly(olefin) film.

Suitable Articles

In one embodiment, the disposable absorbent article according to the present invention is an article, such as a diaper, an adult incontinence product, or a feminine hygiene product, for absorbing aqueous physiological fluids, such as urine. In one embodiment, such disposable absorbent article has a composite laminate structure and comprises at least one layer of a porous hydrophilized fabric, typically a porous hydrophilized nonwoven fabric, at least one layer of a nonporous water impermeable film, such as a poly(ethylene) film, and at least one layer of an adsorbent material, typically a superabsorbent material, disposed between the layer of porous hydrophilized fabric and the layer of nonporous water impermeable film.

As used herein, the term "super-absorbent material" refers to a water-swellable, water-insoluble organic or inorganic material capable, under favorable conditions, of absorbing at least several times, preferably at least 10 times and most preferably at least 30 times, its weight in an aqueous solution containing about 0.9 weight percent of sodium chloride. Suitable superabsorbent materials are generally known. Organic materials suitable for use as a super-absorbent material of the present invention can include natural materials such as agar, pectin, guar gum, and modified natural materials such as the sodium salt of carboxymethylcellulose, as well as synthetic materials such as synthetic hydrogel polymers. Such hydrogel polymers include, for example, alkali metal salts of polyacrylic acids, partially-neutralized polyacrylamides, ethylene maleic anhydride copolymers, and polymers and copolymers of vinyl sulfonic acid, polyacrylates, polyacrylamides, and polyvinyl pyridines. Other suitable polymers include hydrolyzed acrylonitrile grafted starch, acrylic acid grafted starch, and isobutylene maleic anhydride copolymers and mixtures thereof. Examples of polymer materials suitable for use include those comprising monomeric units derived from polymerizable, unsaturated, acid-containing monomers, such as ethylenically unsaturated carboxylic acids, such as acrylic acid or methacrylic acid, acid anhydrides, such as maleic anhydride, ethylenically unsaturated sulfonic acids, and mixtures thereof and optionally further comprising monomeric units derived from non-acid-containing monomers, such as ethylenically unsaturated carboxylic acid ester monomers or ethylenically unsaturated sulfonic acid ester monomers. Other polymer materials for use in the present invention possess a carboxyl group. These polymers include hydrolyzed starch-acrylonitrile graft copolymer, partially neutralized starch-acrylonitrile graft copolymer, starch-acrylic acid graft copolymer, partially neutralized starch-acrylic acid graft copolymer, saponified vinyl acetate-acrylic ester copolymers, hydrolyzed acrylonitrile or acrylamide copolymers, lightly crosslinked products of any of the foregoing copolymers, partially neutralized polyacrylic acid, and slightly network crosslinked products of partially neutralized polyacrylic acid. These polymers may be used either independently or in the form of mixtures with other polymers.

The super-absorbent material is typically present in the form of composite material comprising a granular superabsorbent particulate, typically sized between 100 microns and 1000 microns dispersed in a permeable meshwork that spaces the super-absorbent particles from each other, provides cushioning, provides open voids to permeate and transfer liquid through the composite material, and provides strength to the composite material as a whole. The permeable meshwork may comprise a natural material or a synthetic polymer and typically comprises cellulose fluff. Cellulose fluff is made of cellulose fibers obtained from wood-pulping processes and is commonly used in absorption applications where strands of the fibers are loosely intertwined to provide a meshwork having a greater volumetric percentage of open void than of intertwined strands.

In use, the layer of hydrophilized fabric of the disposable absorbent article is oriented toward the user, typically the wearer, of the disposable absorbent article. Aqueous physiological fluid that may be produced by the user flow tends to flow through the porous hydrophilized fabric layer into the absorbent layer. The nonporous water impermeable film provides a barrier against leakage from the absorbent layer.

The hydrophilized fabric of the invention can also have improved soil release properties for cotton and noncotton fabrics which are woven or nonwoven. The term "soil-release" in accordance with the present invention refers to the ability of the fabric to be washed or otherwise treated to remove soil and/or oily materials that have come into contact with the fabric. The present invention does not wholly prevent the attachment of soils or oily materials to the fabric, but hinders such attachment and improves the cleanability of the fabric.

Soil release polymers are generally very effective on polyester or other synthetic fabrics where the grease, oil or similar hydrophobic stains spread out and form an attached film and thereby are not easily removed in an aqueous laundering process. Many soil release polymers have a less dramatic effect on "blended" fabrics, namely fabrics that comprise a mixture of cotton and synthetic material, and have little or no effect on cotton articles. The reason for the affinity of many soil release agents for synthetic fabric is that the backbone of a polyester soil release polymer typically comprises a mixture of terephthalate residues and ethyleneoxy or propyleneoxy polymeric units; the same materials that comprise the polyester fibers of synthetic fabric. This similar structure of soil release agents and synthetic fabric produce an intrinsic affinity between these compounds.

In one embodiment, the disposable absorbent article is a wipe that comprises one or more layers, each independently comprising a hydrophilized woven fabric or a hydrophilized nonwoven fabric.

EXAMPLES F1-F20 AND COMPARATIVE EXAMPLE F-C1

The treated fabric substrates of Examples F1 to F5 were made as follows.

Phosphate esters P1-P5 according to the above described structure (IX):

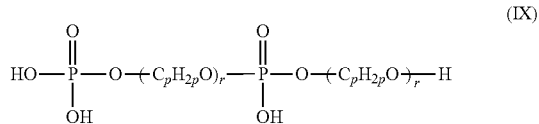

(IX)

wherein p and r are in each case as set forth in TABLE I below were used to make treatment compositions T1-T15.

TABLE I

| Phosphate Esters according to Structure (IX) | | |
|---|---|---|
| Phosphate ester # | p | r |
| P1 | 2 | 4.5 |
| P2 | 2 | 9 |
| P3 | 2 | 13.5 |
| P4 | 2 | 22.5 |
| P5 | 3 | 7.3 |

Treatment compositions T1-T15 were each aqueous solutions comprising water, a respective one of the phosphate esters P1-P5, and in some case, other components. The amounts of phosphate esters P1-P5, the identity of any other components, and the amounts of such phosphate esters and other components contained in each of the treatment compositions are summarized in TABLE II below. Treatment compositions T16, T17, T18, T19, and T20 were each aqueous solutions comprising water contained poly(vinyl alcohol) polymer, but did not contain any organophosphorus compound. The respective poly(vinyl alcohol) polymers used are identified in the footnotes to TABLE II below.

TABLE II

| | Treatment Compositions | | | |
|---|---|---|---|---|
| Treatment | Phosphate Ester | | Other Components | |
| Composition #[1] | # | Amount (wt %) | Component | Amount |
| T1 | P1 | 1 | — | — |
| T2 | P2 | 0.1 | — | — |
| T3 | P2 | 1 | — | — |
| T4 | P2 | 5 | — | — |
| T5 | P3 | 1 | — | — |
| T6 | P3 | 5 | — | — |
| T7 | P4 | 1 | — | — |
| T8 | P2 | 5 | $Ca(OH)_2$ | to pH 5.21 |
| T9 | P2 | 5 | $AlCl_3 \cdot 7H_2O$ | 0.1 wt % |
| T10 | P2 | 5 | LUDOX particles[2] | 5 wt % |
| T11 | P3 | 0.3 | pvOH[3] | 0.2 wt % |
| T12 | P3 | 0.5 | pvOH[3] | 0.1 wt % |
| T13 | P3 | 1 | pvOH[3] | 0.1 wt % |
| T14 | P5 | 1 | — | — |
| T15 | P5 | 5 | — | — |
| T-16 | — | — | pvOH[3] | 0.1 wt % |
| T-17 | — | — | pvOH[4] | 0.1 wt % |
| T-18 | — | — | pvOH[4] | 1.0 wt % |
| T-19 | — | — | pvOH[5] | 0.1 wt % |
| T-20 | — | — | pvOH[5] | 1.0 wt % |

[1] in each case, solution was neutralized with NaOH to a PH value of 7
[2] aluminum coated silica nanoparticles specific surface area 230 $m^2/g$, (LUDOX CL particles, WR Grace)
[3] Poly(vinyl alcohol) having a molecular weight of about 150,000 g/mol and a degree of hydrolysis equal to about 88%, (Erkol ™ poly(vinyl alcohol), Rhodia Inc.)
[4] Poly(vinyl alcohol) having a molecular weight of about 31,000 to about 50,000 g/mol and a degree of hydrolysis equal to about 98%, (#363138, Aldrich)
[5] Poly(vinyl alcohol) having a molecular weight of about 146,000 to about 186,000 g/mol and a degree of hydrolysis equal to about 98%, (#363162, Aldrich)

Nonwoven poly(propylene) fabric was used to show the feasibility of the effect of the previously described samples on low energy surfaces. The nonwoven poly(propylene) fabric samples (each 30 cm×20 cm, having a weight about 17 grams per square meter of fabric and an average thickness of about 0.12 millimeters ("mm")) were cut, marked to distinguish upper side to be treated, weighed, and placed against an aluminum foil. Gloves were worn during all handling of the fabric. The fabric samples of F1-F20 were each treated with a respective one of the treatment compositions T1 to T20 by dipping the fabric sample into the composition, removing the fabric sample from the composition and then squeezing excess composition out of the fabric. The fabric samples of Comparative Example F-C1 remained untreated. The dampened fabrics were then dried at 60° C. for 1 hour in an oven, and cooled to room temperature. The difference between the weight of the fabric after treatment and the weight of the fabric before treatment was typically from about 5 to about 30 wt %, corresponding to about 0.85-5 grams phosphate ester per square meter ("$m^2$") of treated fabric.

The treated fabric samples were evaluated by rinsing in water and measuring the surface tension of rinse water according to ASTM 1331 (except as specifically noted below). In each case, A 20×18 cm sample (360 $cm^2$ total area) was cut from the treated fabric. The fabric sample was placed onto 40 milliliters ("mL") of a 0.909 wt % NaCl aqueous solution and the fabric was stirred in the solution for 10 seconds, the fabric was then allowed to sit without any agitation for 5 minutes, was then stirred for 10 seconds, and was then removed from the solution. The solution was allowed to rest for 10 minutes and the surface tension of the solution was then determined using a Wilhemy plate (Kruss Instruments).

The surface tension results are set forth in TABLE II below in milliNewtons per meter (mN/m) for each of the treated fabrics of Examples F1 to F20 and Comparative Example F-C1.

The surface tension of a control aqueous solution of 0.909 wt % NaCl was determined to be about 72 mM/m. A reduction in the surface tension of the surface tension of the solution used to rinse a treated fabric sample provides a rough indication of the amount of phosphorous compound washed off of the fabric samples of Examples F1 to F20 as compared to Comparative Example F-C1 by the rinse procedure. A rinse solution surface tension that is close to that of the control salt solution indicates minimal rinse-off, and increasing magnitude of the difference between the rinse solution and the control salt solution indicating increasing amount of phosphorous compound rinse-off.

Samples of the treated fabrics of Examples F1 to F20 and Comparative Example F-C1 were also evaluated by a "strikethrough" test according to EDANA test 150.3-96 (except as specifically noted below). In each case, a 12×12 cm sample of treated fabric was placed on top of a stack of 10 filter papers (ERT-FF3) and placed under a 50 mL separating funnel. A conductivity electrode made from stainless steel was placed on top of the stack of filter papers and under the treated fabric. A burette was filled with 0.909 wt % NaCl (saline solution) up to 50 mL. Making sure that the funnel stopcock was closed, a 5 mL aliquot of the saline solution was delivered from the burette to the funnel. The funnel stopcock was opened and the time from the moment the liquid touched the fabric until all liquid disappears into the stack of filter papers (the "strikethrough time") was measured. After 60 seconds, a second 5 mL aliquot of the saline solution was introduced to the fabric sample. Three samples were tested for each treated fabric and five "gushes", that is separate 5 mL aliquots of salt solution, were used for each sample of treated fabric. The results for treated fabrics of Examples F1 to F20 Comparative Example F-C1 are set forth in TABLE III below in seconds (s) as the arithmetic average of the results for three samples of each treated fabrics of Examples F1-F20 Comparative Example F-C1.

TABLE III

Treated Fabric Rinse and Strikethrough Results

| Treated Fabric EX # | Treatment Composition # | Rinse Surface Tension (mN/m) | Strikethrough Gush # | Average Strikethrough Time (s) |
|---|---|---|---|---|
| F1 | T1 | 55.4 | 1 | 17.35 |
|    |    |      | 2 | 18.73 |
|    |    |      | 3 | 18.21 |
|    |    |      | 4 | 14.5 |
|    |    |      | 5 | 13.49 |
| F2 | T2 | 55.0 | 1 | >60 |
|    |    |      | 2 | >60 |
|    |    |      | 3 | >60 |
|    |    |      | 4 | >60 |
|    |    |      | 5 | >60 |
| F3 | T3 | 52.5 | 1 | 4.77 |
|    |    |      | 2 | 17.9 |
|    |    |      | 3 | 18.1 |
|    |    |      | 4 | 16.01 |
|    |    |      | 5 | 13.92 |
| F4 | T4 | 50.1 | 1 | 3.39 |
|    |    |      | 2 | 10.11 |
|    |    |      | 3 | 10.37 |
|    |    |      | 4 | 8.52 |
|    |    |      | 5 | 7.46 |
| F5 | T5 | 48.6 | 1 | 2.70 |
|    |    |      | 2 | 5.13 |
|    |    |      | 3 | 5.62 |
|    |    |      | 4 | 5.21 |
|    |    |      | 5 | 5.50 |
| F6 | T6 | 48.3 | 1 | 2.94 |
|    |    |      | 2 | 5.12 |
|    |    |      | 3 | 5.92 |
|    |    |      | 4 | 5.01 |
|    |    |      | 5 | 5.94 |
| F7 | T7 | 51.0 | 1 | 11.36 |
|    |    |      | 2 | 23.04 |
|    |    |      | 3 | 34.64 |
|    |    |      | 4 | >60 |
|    |    |      | 5 | >60 |
| F8 | T8 | 53.0 | 1 | 2.15 |
|    |    |      | 2 | 4.78 |
|    |    |      | 3 | 6.2 |
|    |    |      | 4 | 4.93 |
|    |    |      | 5 | 4.4 |
| F9 | T9 | 50.9 | 1 | 3.52 |
|    |    |      | 2 | 4.67 |
|    |    |      | 3 | 5.1 |
|    |    |      | 4 | 5.4 |
|    |    |      | 5 | 4.5 |
| F10 | T10 | 50.2 | 1 | 2.97 |
|    |    |      | 2 | 2.72 |
|    |    |      | 3 | 3.51 |
|    |    |      | 4 | 5.17 |
|    |    |      | 5 | 4.77 |
| F11 | T11 | 53.1 | 1 | 2.890 |
|    |    |      | 2 | 3.660 |
|    |    |      | 3 | 4 |
|    |    |      | 4 | 3.8 |
|    |    |      | 5 | 3.94 |
| F12 | T12 | 48.3 | 1 | 3.17 |
|    |    |      | 2 | 3.96 |
|    |    |      | 3 | 4.09 |
|    |    |      | 4 | 4.74 |
|    |    |      | 5 | 3.95 |
| F13 | T13 | 52.5 | 1 | 2 |
|    |    |      | 2 | 3.18 |
|    |    |      | 3 | 3.14 |
|    |    |      | 4 | 3.23 |
|    |    |      | 5 | 3.49 |
| F14 | T14 | 48.6 | 1 | 3.14 |
|    |    |      | 2 | 11.48 |
|    |    |      | 3 | 25.49 |
|    |    |      | 4 | 21.01 |
|    |    |      | 5 | 9.82 |
| F15 | T15 | 45.8 | 1 | 2.55 |
|    |    |      | 2 | 12.15 |
|    |    |      | 3 | 31.82 |
|    |    |      | 4 | 29.41 |
|    |    |      | 5 | 19.02 |
| F16 | T16 | 45.4 | 1 | 5.79 |
|    |    |      | 2 | 4.9 |
|    |    |      | 3 | 5.01 |
|    |    |      | 4 | 5.75 |
|    |    |      | 5 | 5.59 |
| F17 | T17 | 51.06 | 1 | 3.33 |
|    |    |      | 2 | 4.22 |
|    |    |      | 3 | 3.66 |
|    |    |      | 4 | 3.24 |
|    |    |      | 5 | 3.1 |
| F18 | T18 | 53.08 | 1 | 3.05 |
|    |    |      | 2 | 12.14 |
|    |    |      | 3 | 8.43 |
|    |    |      | 4 | 6.58 |
|    |    |      | 5 | 6.71 |
| F19 | T19 | 54.48 | 1 | 1.93 |
|    |    |      | 2 | 3.16 |
|    |    |      | 3 | 3.16 |
|    |    |      | 4 | 3.2 |
|    |    |      | 5 | 3.18 |

TABLE III-continued

Treated Fabric Rinse and Strikethrough Results

| Treated Fabric EX # | Treatment Composition # | Rinse Surface Tension (mN/m) | Strikethrough Gush # | Average Strikethrough Time (s) |
|---|---|---|---|---|
| F20 | T20 | 50.16 | 1 | 2.73 |
|  |  |  | 2 | 3.2 |
|  |  |  | 3 | 3.15 |
|  |  |  | 4 | 2.79 |
|  |  |  | 5 | 3 |
| F-C1 | not treated | 66 | 1 | >360 |
|  |  |  | 2 | >360 |
|  |  |  | 3 | >360 |
|  |  |  | 4 | >360 |
|  |  |  | 5 | >360 |

Polyamide with Pigment Examples

FIG. 1 shows untreated polyamide on which water is distributed along the fibers due to capillary forces only.

Figure 2:
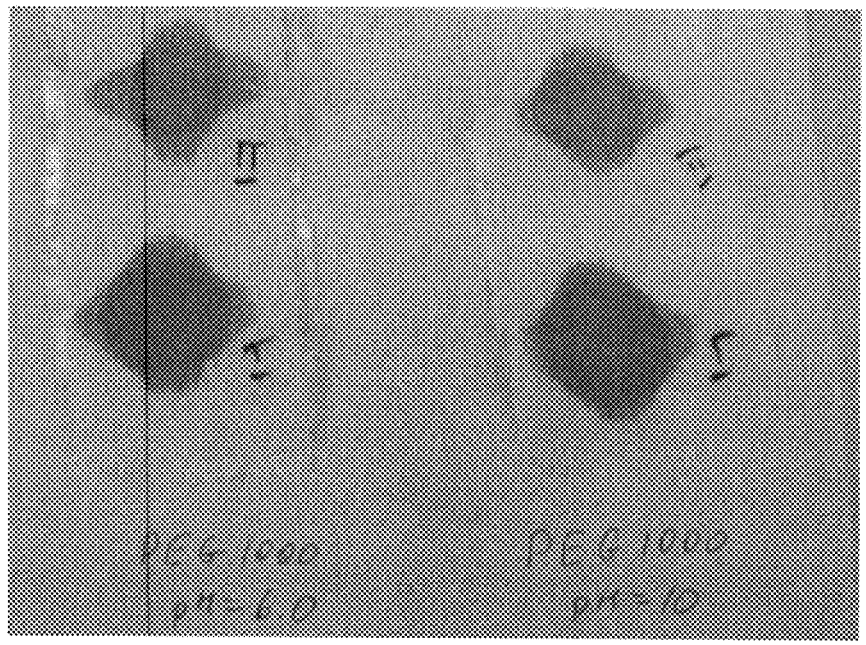
FIG. 2 shows Polyamide treated with 1 wt. % solution of PEG 1000 phosphate ester wherein water can spread due to hydrophilization of fibers.

In another experiment an aqueous solution of 1 wt. % PEG 1000 Phosphate Ester was used to treat polyamide. The treatment was done by dipping the polyamide into a solution of 1 wt. % PEG 1000 phosphate ester in water, and immediately washing it (then dry, then dropping water+dye). FIG. 2 shows the spreading of dyed water on woven polyamide due to the adsorption of PEG phosphate ester. In particular, FIG. 2 shows the polyamide treated with 1 wt. % solution of PEG 1000 phosphate ester wherein water spread due to hydrophilization of fibers.

It is apparent that embodiments other than those expressly listed above come within the spirit and scope of the present invention. Thus, the present invention is not limited by the above-provided description but rather is defined by the claims appended hereto.

The invention claimed is:

1. A hydrophilized article, comprising:
   (a) a substrate having a hydrophobic surface, and
   (b) a hydrophilizing layer disposed on at least a portion of the hydrophobic surface of the substrate, said layer comprising:
      (b)(I) an organophosphorus material selected from:
         (b)(I)(1) organophosphorus compounds according to structure (I):

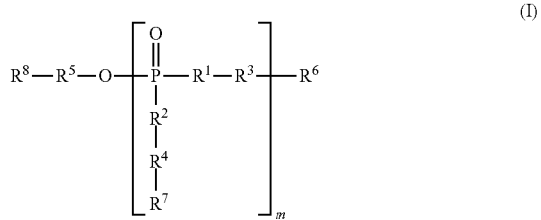

(I)

wherein:
each $R^1$ is and each $R^2$ is O,
each $R^3$ is independently a divalent radical according to structure (V),

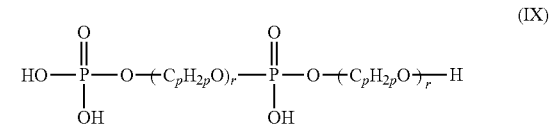

(V)

each p, q is independently 2, 3, or 4,
each r is independently a number of from 1 to about 100,
each s is 0,
each t is 1,
$R^5$ is and each $R^4$ is absent,
$R^6$ and $R^8$ are each and each $R^7$ is independently H or $-POR^9R^{10}$,
$R^9$ and $R^{10}$ are each independently hydroxyl, and
m is an integer of from 2 to 5,
         (b)(I)(2) salts of organophosphorus compounds according to structure (I),
         (b)(I)(3) condensation reaction products of two or more molecules of one or more organophosphorus compounds according to structure (I), wherein for each of said two or more molecules m is an integer from 1 to 5, and
         (b)(I)(4) mixtures comprising two or more of the compounds, salts, and/or reaction products of (b)(I)(1), (b)(I)(2), and (b)(I)(3).

2. The hydrophilized article of claim 1, wherein the substrate consists of cellulosic fiber.

3. The hydrophilized article of claim 1, wherein $R^6$, $R^8$, and each $R^7$ are each H.

4. The hydrophilized article of claim 1, wherein in the organophosphorus compounds, according to structure (II):
$R^6$, $R^8$, and each $R^7$ are each H,
$R^4$ and $R^5$ are each absent,
each $R^3$ is independently the divalent radical according to structure (V),

(V)

each p, q is independently 2 or 3,
each r is independently a number of from 4 to about 100,
each s is 0,
each t is 1, and
m is the integer of from 2 to 5.

5. The hydrophilized article of claim 1, wherein the organophosphorus material is selected from:
(X)(1) organophosphorus compounds according to structure (IX):

$$HO-\overset{O}{\underset{OH}{\overset{\|}{P}}}-O-(C_pH_{2p}O)_r-\overset{O}{\underset{OH}{\overset{\|}{P}}}-O-(C_pH_{2p}O)_r-H$$

(IX)

wherein:
p is 2, 3, or 4,
r is a number of from 4 to about 50,
(IX)(2) salts organophosphorus compounds according to structure (IX), and
(IX)(3) mixtures comprising two or more of the compounds and/or salts of (IX)(1) and (IX)(2).

6. The hydrophilized article of claim 1, wherein the organophosphorus material (b)(I) comprises the condensation reaction product of two or more molecules according to structure (I).

7. The hydrophilized article of claim 1, wherein the organophosphorus material (b)(I) comprises the condensation reaction product of two or more molecules according to structure (I) in the form of a linear molecule.

8. The hydrophilized article of claim 1, wherein the organophosphorus material (b)(I) comprises the condensation reaction product of two or more molecules according to structure (I) in the form of a linear molecule, selected from the group consisting of a linear condensation reaction product according to structure (X),

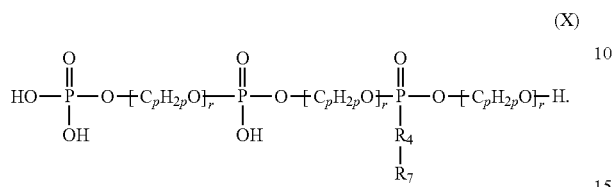

(X)

9. The hydrophilized article of claim 1, wherein at least one of $R^6$ and $R^8$ and each $R^7$ is —$POR^9R^{10}$, wherein $R^9$ and $R^{10}$ are each independently hydroxyl.

10. The article of claim 1, wherein said organophosphorus material $R^3$ is —$(C_pH_{2p}O)_r$ such that $R^1$-$R^3$ is $R^1$—$(C_pH_{2p}O)_r$, p is 2, 3, or 4, and r is a number of from 1 to about 50.

11. The hydrophilized article of claim 1, wherein the organophosphorus material (b)(I) comprises the condensation reaction product of two or more molecules according to structure (I) in the form of a crosslinked network.

12. The hydrophilized article of claim 11, wherein the crosslinked network comprises a condensation reaction product network illustrated by structure (XI):

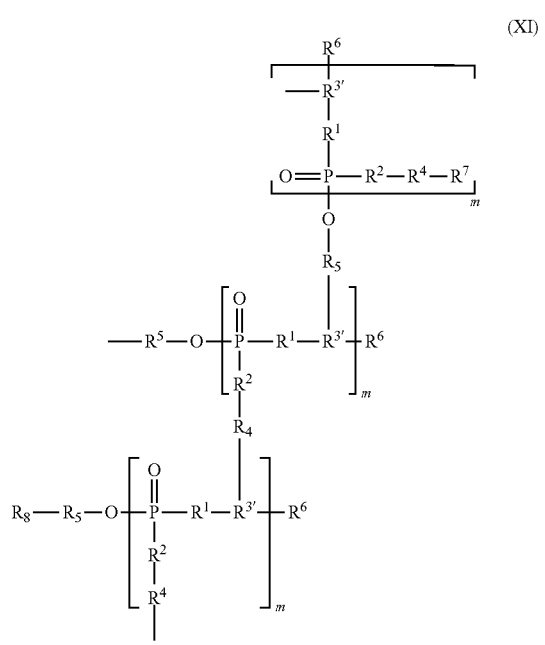

(XI)

wherein
$R^1$, $R^2$, $R^4$, $R^5$, $R^6$, $R^7$, $R^8$, and m are each as defined in claim 11, and
each $R^{3'}$ is independently a residue of an $R^3$ group of a compound according to structure (I), as defined in claim 11.

13. The article of claim 1, wherein said layer comprising:
(b)(I) said organophosphorus material selected from:
(b)(I)(1) organophosphorus compounds according to structure (Ia):

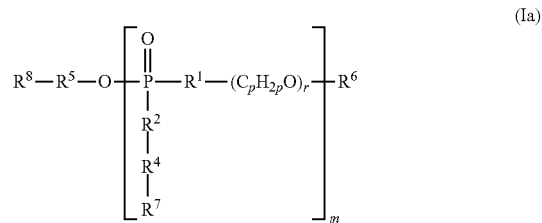

(Ia)

wherein:
each $R^1$ is and each $R^2$ is O,
$R^5$ is and each $R^4$ is independently absent,
$R^6$ and $R^8$ are each and each $R^7$ is independently H or $POR^9R^{10}$,
$R^9$ and $R^{10}$ are each independently hydroxyl, and
m is an integer of from 2 to 5, (b)(I)(2) salts of organophosphorus compounds according to structure (I), (b)(I)(3) condensation reaction products of two or more molecules of one or more organophosphorus compounds according to structure (I), and (b)(I)(4) mixtures comprising two or more of the compounds, salts, and/or reaction products of (b)(I)(1), (b)(I)(2), and (b)(I)(3);

p is 2, 3, or 4, and r is a number of from 4 to about 50.

14. The hydrophilized article of claim 1, wherein the hydrophilizing layer further comprises:
(c)(II) a vinyl alcohol material selected from:
(c)(II)(1) polymers comprising monomeric units according to structure (I-a):

(I-a)

(c)(II)(2) salts of polymers (c)(II)(1),
(c)(II)(3) reaction products of two or more molecules of one or more polymers (c)(II)(1), and
(c)(II)(4) mixtures comprising two or more of the polymers, salts, and/or reaction products of (c)(II)(1), (c)(II)(2), and (c)(II)(3).

15. The article of claim 14, wherein the vinyl alcohol is made by a process comprising polymerizing a vinyl ester monomer and having a degree of hydrolysis at least 88%.

16. The article of claim 14, wherein the vinyl alcohol is made by a process comprising polymerizing a vinyl acetate to form a poly(vinyl acetate) homopolymer or copolymer having a hydrocarbon backbone and ester substituent groups and then hydrolyzing at least a portion of the ester substituent groups to form hydroxyl-substituted monomeric units according to structure I-a and having a degree of hydrolysis of 88 to 99%, wherein the vinyl alcohol polymer is a copolymer that comprises hydroxy-substituted monomeric units according to structure I-a and ester substituted monomeric units resulting from incomplete hydrolysis of the poly(vinyl acetate) homopolymer.

17. The article of claim 14, wherein the vinyl alcohol is a homopolymer comprising monomeric units according to structure (I-a):

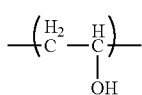

(I-a)

or a copolymer of greater than 50% said monomeric units according to structure (I-a) and a hydrophilic monomer unit or a hydrophobic monomeric unit;

the hydrophilic monomeric unit selected from the group consisting of monomeric units derived from hydroxy ($C_1$-$C_4$)alkyl(meth)acrylates, (meth)acrylamide, ($C_1$-$C_4$)alkyl(meth)acrylamides, N,N-dialkyl-acrylamides, alkoxylated (meth)acrylates, poly(ethylene glycol)-mono methacrylates and poly(ethyleneglycol)-monomethylether methacrylates, hydroxy($C_1$-$C_4$)acrylamides and methacrylamides, hydroxyl($C_1$-$C_4$)alkyl vinyl ethers, N-vinylpyrrole, N-vinyl-2-pyrrolidone, 2- and 4-vinylpyridine, amino($C_1$-$C_4$)alkyl, mono($C_1$-$C_4$) alkylamino($C_1$-$C_4$)alkyl, and di($C_1$-$C_4$)alkylamino($C_1$-$C_4$)alkyl(meth)acrylates, allyl alcohol, dimethylaminoethyl methacrylate, and dimethylaminoethylmethacrylamide;

the hydrophobic monomeric unit selected from the group consisting of monomeric units derived from ($C_1$-$C_{18}$) alkyl and ($C_5$-$C_{18}$)cycloalkyl(meth)acrylates, ($C_5$-$C_{18}$) alkyl(meth)acrylamides, (meth)acrylonitrile, vinyl($C_1$-$C_{18}$)alkanoates, ($C_2$-$C_{18}$)alkenes, ($C_2$-$C_{18}$)haloalkenes, styrene, ($C^1$—$C_6$)alkylstyrenes, ($C_4$-$C_{12}$)alkyl vinyl ethers, fluorinated ($C_2$-$C_{10}$)alkyl(meth)acrylates, ($C_3$-$C_{12}$)perfluoroalkylethylthiocarbonylaminoethyl(meth) acrylates, (meth)acryloxyalkylsiloxanes, N-vinylcarbazole, ($C_1$-$C_{12}$) alkyl maleic, fumaric, itaconic, and mesaconic acid esters, vinyl acetate, vinyl propionate, vinyl butyrate, vinyl valerate, chloroprene, vinyl chloride, vinylidene chloride, vinyltoluene, vinyl ethyl ether, perfluorohexyl ethylthiocarbonylaminoethyl methacrylate, isobornyl methacrylate, trifluoroethyl methacrylate, hexa-fluoroisopropyl methacrylate, hexafluorobutyl methacrylate, tristrimethylsilyloxysilylpropyl methacrylate, and 3-methacryloxypropylpentamethyldisiloxane.

18. An absorbent article, comprising:
(a) a substrate having a hydrophobic surface, and
(b) a hydrophilizing layer disposed on at least a portion of the hydrophobic surface of the substrate to improve soil release of the substrate, said layer comprising
(b)(I) an organophosphorus material selected from:
(b)(I)(1) organophosphorus compounds according to structure (I):

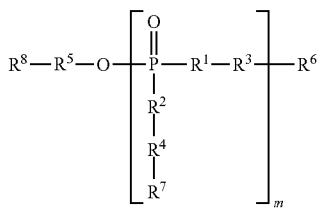

(I)

wherein:
each $R^1$ is and each $R^2$ is O,
each $R^3$ is independently a divalent radical according to structure (V),

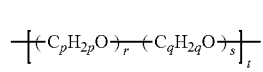

(V)

each p, q is independently 2, 3, or 4,
each r is independently a number of from 1 to about 100,
each s is 0,
each t is 1,
$R^5$ is and each $R^4$ is absent,
$R^6$ and $R^8$ are each and each $R^7$ is independently H or —$POR^9R^{10}$,
$R^9$ and $R^{10}$ are each independently hydroxyl, and
m is an integer of from 2 to 5,
(b)(I)(2) salts of organophosphorus compounds according to structure (I),
(b)(I)(3) condensation reaction products of two or more molecules of one or more organophosphorus compounds according to structure (I), wherein for each of said two or more molecules m is an integer from 1 to 5, and
(b)(I)(4) mixtures comprising two or more of the compounds, salts, and/or reaction products of (b)(I)(1), (b)(I)(2), and (b)(I)(3).

19. The article of claim 18, wherein said hydrophilizing layer further comprises:
(c)(II) a vinyl alcohol material selected from:
(c)(II)(1) polymers comprising monomeric units according to structure (I-a):

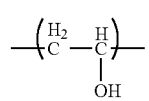

(I-a)

(c)(II)(2) salts of polymers (c)(II)(1),
(c)(II)(3) reaction products of two or more molecules of one or more polymers (c)(II)(1), and
(c)(II)(4) mixtures comprising two or more of the polymers, salts, and/or reaction products of (c)(II)(1), (c)(II)(2), and (c)(II)(3).

20. The article of claim 18, wherein $R^6$ and $R^8$ are each and each $R^7$ is H.

21. The article of claim 18, wherein the substrate consists of cellulosic fiber.

22. The article of claim 18, wherein each p is independently 2 or 3, each q is independently 2 or 3 is independently 2 or 3, and each r is independently a number of from 4 to about 100.

23. The article of claim 18, wherein said organophosphorus material is selected from:
(X)(1) organophosphorus compounds according to structure (IX):

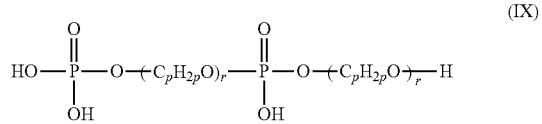

(IX)

wherein:
p is 2, 3, or 4,
r is a number of from 4 to about 50,
(IX)(2) salts organophosphorus compounds according to structure (IX), and (IX)(3) mixtures comprising two or more of the compounds and/or salts of (IX)(1) and (IX)(2).

24. The article of claim 18, wherein $R^6$, $R^8$, and each $R^7$ are each H.

25. The article of claim 18, wherein said organophosphorus material $R^3$ is $-(C_pH_{2p}O)_r$ such that $R^1$-$R^3$ is $R^1-(C_pH_{2p}O)_r$, p is 2, 3, or 4, and r is a number of from 1 to about 50.

26. A hydrophilized article, comprising:
(a) a substrate having a surface, and
(b) a hydrophilizing layer disposed on at least a portion of the surface of the substrate, said layer comprising:
(b)(I) an organophosphorus material selected from:
(b)(I)(1) at least one organophosphorus compound selected from:
(II)(1) an organophosphate ester according to structure (II):

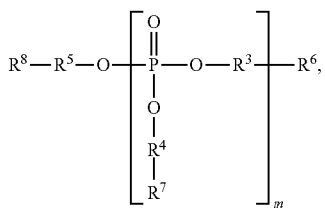

(II)(2) salts of organophosphorus compounds according to structure (II),
(II)(3) condensation reaction products of two or more molecules of one or more organophosphorus compounds according to structure (II), and
(II)(4) mixtures comprising two or more of the compounds, salts, and/or reaction products of (II)(1), (II)(2), and (II)(3),
wherein in the organophosphorus compounds, according to structure (II)
$R^6$ and $R^8$ are each and each $R^7$ is independently H,
$R^4$ and $R^5$ are each absent,
each $R^3$ is independently a divalent radical according to structure (V), (VI), or (VII), and
m is an integer of from 1 to 5,
wherein in the organophosphorus compounds, each $R^3$ is a divalent radical according to structure (V), (VI), (VII), or (VIII):

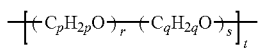

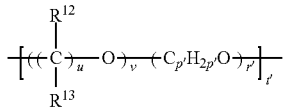

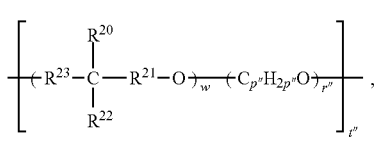

wherein:
each $R^{12}$ and each $R^{13}$ is independently H, alkyl, hydroxyalkyl, alkoxy, alkenyl, aryl, aryloxy, or two $R^{12}$ groups that are attached to the adjacent carbon atoms may be fused to form, together with the carbon atoms to which they are attached, a $(C_6$-$C_8)$hydrocarbon ring,
$R^{20}$ is H, hydroxyl, alkyl, hydroxyalkyl, alkoxy, alkenyl, aryl, or aryloxy
$R^{22}$ is hydroxyl or hydroxyalkyl, provided that $R^{20}$ and $R^{22}$ are not each hydroxyl,
$R^{23}$ and $R^{21}$ are each independently methylene or poly(methylene),
p, p', p", and q are each independently integers of from 2 to 5,
each r, s, r', and r" is independently a number of from 0 to 25, provided that at least one of r and s is not 0,
u is an integer of from 2 to 10,
v and w are each numbers of from 1 to 25, and
t, t', and t" are each numbers of from 1 to 25,
provided that the product of the quantity (r+s) multiplied times t is less than or equal to about 100, the product of the quantity (v+r') multiplied times t' is less than or equal to about 100, and the product of the quantity (w+r") multiplied time t" is less than or equal to about 100;
(b)(I)(2) salts of organophosphorus compounds according to structure (I),
(b)(I)(3) condensation reaction products of two or more molecules of one or more organophosphorus compounds according to structure (I), wherein for each of said two or more molecules m is an integer from 1 to 5, and
(b)(I)(4) mixtures comprising two or more of the compounds, salts, and/or reaction products of (b)(I)(1), (b)(I)(2), and (b)(I)(3).

27. A method for making the hydrophilized article of claim 26, comprising treating at least a portion of such surface with said organophosphorus material.

28. The hydrophilized article of claim 26, wherein the hydrophilized article is an absorbent article.

29. The article of claim 26, wherein the substrate consists of cellulosic fiber.

30. The article of claim 29, wherein said organophosphorus material is selected from:
(X)(1) organophosphorus compounds according to structure (IX):

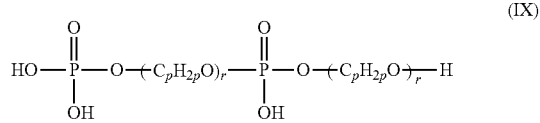

wherein:
p is 2, 3, or 4,
r is a number of from 4 to about 50,
(IX)(2) salts organophosphorus compounds according to structure (IX), and
(IX)(3) mixtures comprising two or more of the compounds and/or salts of (IX)(1) and (IX)(2).

31. The article of claim 29,
wherein in structure (V) each p is independently 2 or 3, each q is independently 2 or 3 is independently 2 or 3, and each r is independently a number of from 4 to about 100;
wherein in structure (VI), each $R^3$ is independently a divalent radical according to structure (VI), wherein the $R^{12}$ groups are fused to form, including the carbon atoms to which they are attached, a $(C_6$-$C_8)$ hydrocarbon ring, each $R^{13}$ is H, p' is 2 or 3, u is 2, v is an integer of from 1 to 3, r' is an integer from 1 to 25, t' is a number of from 1 to 25, the product of the quantity (v+r') multiplied times t" is less than or equal to about 100, and $R^4$ and $R^5$ are each independently absent or $R^3$;

wherein in structure (VII) $R^{20}$ is hydroxyl or hydroxyalkyl, $R^{22}$ is H, alkyl, hydroxyl, or hydroxyalkyl, provided that $R^{20}$ and $R^{22}$ are not each hydroxyl, $R^{21}$ and $R^{23}$ are each independently methylene, di(methylene), or tri(methylene), w is 1 or 2, p" is 2 or 3, r" is an integer of from 1 to 25, t" is a number of from 1 to 25, the product of the quantity (w+r") multiplied times t" is less than or equal to about 100, more typically less than or equal to about 50, and $R^4$ and $R^5$ are each independently absent or $R^3$.

32. The article of claim 26, wherein the substrate consists of cotton fiber.

33. The article of claim 10, wherein $R^6$, $R^8$, and each $R^7$ are each H.

34. A method for hydrophilizing a substrate having a hydrophobic surface and improving soil release of the substrate, comprising treating at least a portion of such hydrophobic surface with:
(b)(I) an organophosphorus material selected from:
(b)(I)(1) organophosphorus compounds according to structure (I):

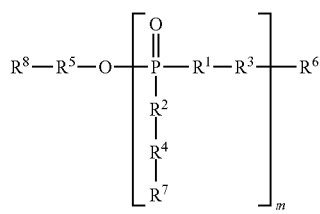

wherein:
each $R^1$ is and each $R^2$ is O,
each $R^3$ is independently divalent radical according to structure (V),

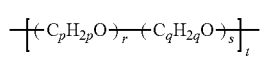

each p, q is independently 2, 3, or 4,
each r is independently a number of from 1 to about 100,
each s is 0,
each t is 1,
$R^5$ is and each $R^4$ is absent,
$R^6$ and $R^8$ are each and each $R^7$ is independently H or —$POR^9R^{10}$,
$R^9$ and $R^{10}$ are each independently hydroxyl, and
m is an integer of from 2 to 5,
(b)(I)(2) salts of organophosphorus compounds according to structure (I),
(b)(I)(3) condensation reaction products of two or more molecules of one or more organophosphorus compounds according to structure (I), wherein for each of said two or more molecules m is an integer from 1 to 5, and
(b)(I)(4) mixtures comprising two or more of the compounds, salts, and/or reaction products of (b)(I)(1), (b)(I)(2), and (b)(I)(3).

35. The method for hydrophilizing a substrate having a hydrophobic surface according to claim 34, comprising treating at least a portion of such hydrophobic surface with a treating composition comprising the organophosphorus material, wherein the treatment composition further comprises
(c)(II) a vinyl alcohol material selected from:
(c)(II)(1) polymers comprising monomeric units according to structure (I-a):

(c)(II)(2) salts of polymers (c)(II)(1),
(d)(II)(3) reaction products of two or more molecules of one or more polymers (c)(II)(1), and
(e)(II)(4) mixtures comprising two or more of the polymers, salts, and/or reaction products of (c)(II)(1), (c)(II)(2), and (c)(II)(3).

36. The method of claim 34, wherein the substrate consists of cellulosic fiber.

37. The method of claim 34, wherein each p is independently 2 or 3, each q is independently 2 or 3 is independently 2 or 3, and each r is independently a number of from 4 to about 100.

38. The method of claim 34, wherein said organophosphorus material is selected from:
(X)(1) organophosphorus compounds according to structure (IX):

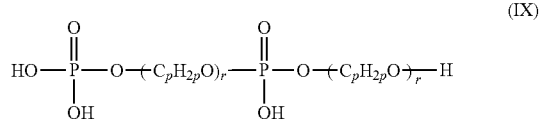

wherein:
p is 2, 3, or 4,
r is a number of from 4 to about 50,
(IX)(2) salts organophosphorus compounds according to structure (IX), and
(IX)(3) mixtures comprising two or more of the compounds and/or salts of (IX)(1) and (IX)(2).

39. The method of claim 34, wherein $R^6$, $R^8$, and each $R^7$ are each H.

40. The method of claim 34, wherein said organophosphorus material $R^3$ is —$(C_pH_{2p}O)_r$ such that $R^1$—$R^3$ is $R^1$—$(C_pH_{2p}O)_r$, p is 2, 3, or 4, and r is a number of from 1 to about 50.

* * * * *